US012354433B2

(12) United States Patent
Lyons

(10) Patent No.: US 12,354,433 B2
(45) Date of Patent: Jul. 8, 2025

(54) ANIMATING GAMING-TABLE OUTCOME INDICATORS FOR DETECTED RANDOMIZING-GAME-OBJECT STATES

(71) Applicant: LNW Gaming, Inc., Las Vegas, NV (US)

(72) Inventor: Martin S. Lyons, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 267 days.

(21) Appl. No.: 18/153,381

(22) Filed: Jan. 12, 2023

(65) Prior Publication Data

US 2023/0230439 A1 Jul. 20, 2023

Related U.S. Application Data

(60) Provisional application No. 63/299,747, filed on Jan. 14, 2022.

(51) Int. Cl.
*G07F 17/32* (2006.01)

(52) U.S. Cl.
CPC ........ *G07F 17/3211* (2013.01); *G07F 17/322* (2013.01); *G07F 17/3293* (2013.01)

(58) Field of Classification Search
CPC ............... G07F 17/3211; G07F 17/322; G07F 17/3293; G07F 17/3241
USPC ............................................... 463/11, 12, 13
See application file for complete search history.

(56) References Cited

U.S. PATENT DOCUMENTS 5,103,081 A 4/1992 Fisher et al.
5,451,054 A 9/1995 Orenstein
5,757,876 A 5/1998 Dam et al.
6,460,848 B1 10/2002 Soltys et al.
6,514,140 B1 2/2003 Storch
6,517,435 B2 2/2003 Soltys et al.
6,517,436 B2 2/2003 Soltys et al.
6,520,857 B2 2/2003 Soltys et al.
6,527,271 B2 3/2003 Soltys et al.
6,530,836 B2 3/2003 Soltys et al.
6,530,837 B2 3/2003 Soltys et al.
(Continued)

FOREIGN PATENT DOCUMENTS

KR 1020160088224 A 7/2016
WO 2009062153 A1 5/2009

OTHER PUBLICATIONS

US 10,854,041 B2, 12/2020, Shigeta (withdrawn)

*Primary Examiner* — Pierre E Elisca

(57) ABSTRACT

In one example, a gaming system for determining, via image analysis, an outcome value (e.g., a card value) of a randomizing game object (e.g., a playing card) for a game played at a gaming table and also detecting, based on the outcome value and one or more game rules, an occurrence of a winning outcome for the game. The gaming system can further determine, via image analysis, a location at a gaming table surface related to the winning outcome. The gaming system can further, in response to determining the location, render a virtual-scene overlay having an outcome indicator positioned at pixel coordinates that correspond to the location. The gaming system can further project the virtual-scene overlay at the gaming table to cause an image of the outcome indicator to appear at, and in some examples conform to a shape of, the location at the gaming table surface.

19 Claims, 8 Drawing Sheets

(56) References Cited

U.S. PATENT DOCUMENTS

| | | | | |
|---|---|---|---|---|
| 6,533,276 | B2 | 3/2003 | Soltys et al. | |
| 6,533,662 | B2 | 3/2003 | Soltys et al. | |
| 6,579,180 | B2 | 6/2003 | Soltys et al. | |
| 6,579,181 | B2 | 6/2003 | Soltys et al. | |
| 6,595,857 | B2 | 7/2003 | Soltys et al. | |
| 6,663,490 | B2 | 12/2003 | Soltys et al. | |
| 6,688,979 | B2 | 2/2004 | Soltys et al. | |
| 6,712,696 | B2 | 3/2004 | Soltys et al. | |
| 6,758,751 | B2 | 7/2004 | Soltys et al. | |
| 7,011,309 | B2 | 3/2006 | Soltys et al. | |
| 7,124,947 | B2 | 10/2006 | Storch | |
| 7,316,615 | B2 | 1/2008 | Soltys et al. | |
| 7,753,781 | B2 | 7/2010 | Storch | |
| 7,771,272 | B2 | 8/2010 | Soltys et al. | |
| 8,130,097 | B2 | 3/2012 | Knust et al. | |
| 8,285,034 | B2 | 10/2012 | Rajaraman et al. | |
| 8,606,002 | B2 | 12/2013 | Rajaraman et al. | |
| 8,896,444 | B1 | 11/2014 | Knust et al. | |
| 9,165,420 | B1 | 10/2015 | Knust et al. | |
| 9,174,114 | B1 | 11/2015 | Knust et al. | |
| 9,378,605 | B2 | 6/2016 | Koyama | |
| 9,511,275 | B1 | 12/2016 | Knust et al. | |
| 9,613,487 | B2 | 4/2017 | Kelly et al. | |
| 9,795,870 | B2 | 10/2017 | Ratliff | |
| 9,811,735 | B2 | 11/2017 | Cosatto | |
| 9,889,371 | B1 | 2/2018 | Knust et al. | |
| 10,032,335 | B2 | 7/2018 | Shigeta | |
| 10,096,206 | B2 | 10/2018 | Bulzacki et al. | |
| 10,192,085 | B2 | 1/2019 | Shigeta | |
| 10,242,525 | B1 | 3/2019 | Knust et al. | |
| 10,242,527 | B2 | 3/2019 | Bulzacki et al. | |
| 10,304,191 | B1 | 5/2019 | Mousavian et al. | |
| 10,380,838 | B2 | 8/2019 | Bulzacki et al. | |
| 10,398,202 | B2 | 9/2019 | Shigeta | |
| 10,403,090 | B2 | 9/2019 | Shigeta | |
| 10,410,066 | B2 | 9/2019 | Bulzacki et al. | |
| 10,438,454 | B2 * | 10/2019 | Miller | A63F 1/18 |
| 10,493,357 | B2 | 12/2019 | Shigeta | |
| 10,529,183 | B2 | 1/2020 | Shigeta | |
| 10,540,846 | B2 | 1/2020 | Shigeta | |
| 10,580,254 | B2 | 3/2020 | Shigeta | |
| 10,593,154 | B2 | 3/2020 | Shigeta | |
| 10,600,279 | B2 | 3/2020 | Shigeta | |
| 10,600,282 | B2 | 3/2020 | Shigeta | |
| 10,665,054 | B2 | 5/2020 | Shigeta | |
| 10,706,675 | B2 | 7/2020 | Shigeta | |
| 10,720,013 | B2 | 7/2020 | Main, Jr. | |
| 10,741,019 | B2 | 8/2020 | Shigeta | |
| 10,748,378 | B2 | 8/2020 | Shigeta | |
| 10,755,524 | B2 | 8/2020 | Shigeta | |
| 10,755,525 | B2 | 8/2020 | Shigeta | |
| 10,762,745 | B2 | 9/2020 | Shigeta | |
| 10,825,288 | B1 | 11/2020 | Knust et al. | |
| 10,832,517 | B2 | 11/2020 | Bulzacki et al. | |
| 10,846,980 | B2 | 11/2020 | French et al. | |
| 10,846,985 | B2 | 11/2020 | Shigeta | |
| 10,846,986 | B2 | 11/2020 | Shigeta | |
| 10,846,987 | B2 | 11/2020 | Shigeta | |
| 11,383,282 | B2 | 7/2022 | Lacaze et al. | |
| 11,495,085 | B2 | 11/2022 | Lyons et al. | |
| 2005/0059479 | A1 | 3/2005 | Soltys et al. | |
| 2006/0019739 | A1 | 1/2006 | Soltys et al. | |
| 2007/0087834 | A1 | 4/2007 | Moser et al. | |
| 2010/0311489 | A1 * | 12/2010 | Miller | A63F 1/12 463/31 |
| 2010/0311502 | A1 * | 12/2010 | Miller | A63F 1/02 463/30 |

| | | | | |
|---|---|---|---|---|
| 2011/0115158 | A1 | 5/2011 | Gagner et al. | |
| 2011/0230248 | A1 | 9/2011 | Baerlocher et al. | |
| 2015/0080077 | A1 * | 3/2015 | Miller | G07F 17/3293 463/11 |
| 2016/0089594 | A1 | 3/2016 | Yee | |
| 2017/0206747 | A1 * | 7/2017 | Miller | G07F 17/3293 |
| 2018/0040190 | A1 | 2/2018 | Keilwert et al. | |
| 2018/0053377 | A1 | 2/2018 | Shigeta | |
| 2018/0061178 | A1 | 3/2018 | Shigeta | |
| 2018/0068525 | A1 | 3/2018 | Shigeta | |
| 2018/0075698 | A1 | 3/2018 | Shigeta | |
| 2018/0114406 | A1 | 4/2018 | Shigeta | |
| 2018/0211110 | A1 | 7/2018 | Shigeta | |
| 2018/0211472 | A1 | 7/2018 | Shigeta | |
| 2018/0232987 | A1 | 8/2018 | Shigeta | |
| 2018/0239984 | A1 | 8/2018 | Shigeta | |
| 2018/0336757 | A1 | 11/2018 | Shigeta | |
| 2019/0043309 | A1 | 2/2019 | Shigeta | |
| 2019/0088082 | A1 | 3/2019 | Shigeta | |
| 2019/0102987 | A1 | 4/2019 | Shigeta | |
| 2019/0147689 | A1 | 5/2019 | Shigeta | |
| 2019/0172312 | A1 | 6/2019 | Shigeta | |
| 2019/0188957 | A1 | 6/2019 | Bulzacki et al. | |
| 2019/0188958 | A1 | 6/2019 | Shigeta | |
| 2019/0236891 | A1 | 8/2019 | Shigeta | |
| 2019/0259238 | A1 | 8/2019 | Shigeta | |
| 2019/0266832 | A1 | 8/2019 | Shigeta | |
| 2019/0318576 | A1 | 10/2019 | Shigeta | |
| 2019/0320768 | A1 | 10/2019 | Shigeta | |
| 2019/0333322 | A1 | 10/2019 | Shigeta | |
| 2019/0333323 | A1 | 10/2019 | Shigeta | |
| 2019/0333326 | A1 | 10/2019 | Shigeta | |
| 2019/0340873 | A1 | 11/2019 | Shigeta | |
| 2019/0344157 | A1 | 11/2019 | Shigeta | |
| 2019/0347893 | A1 | 11/2019 | Shigeta | |
| 2019/0347894 | A1 | 11/2019 | Shigeta | |
| 2019/0362594 | A1 | 11/2019 | Shigeta | |
| 2019/0371112 | A1 | 12/2019 | Shigeta | |
| 2019/0392680 | A1 | 12/2019 | Shigeta | |
| 2020/0034629 | A1 | 1/2020 | Vo et al. | |
| 2020/0035060 | A1 | 1/2020 | Shigeta | |
| 2020/0065618 | A1 | 2/2020 | Zhang | |
| 2020/0118390 | A1 | 4/2020 | Shigeta | |
| 2020/0122018 | A1 | 4/2020 | Shigeta | |
| 2020/0143626 | A1 | 5/2020 | Moore et al. | |
| 2020/0175806 | A1 | 6/2020 | Shigeta | |
| 2020/0202134 | A1 | 6/2020 | Bulzacki et al. | |
| 2020/0226878 | A1 | 7/2020 | Shigeta | |
| 2020/0234464 | A1 | 7/2020 | Shigeta | |
| 2020/0242888 | A1 | 7/2020 | Shigeta | |
| 2020/0258351 | A1 | 8/2020 | Shigeta | |
| 2020/0265672 | A1 | 8/2020 | Shigeta | |
| 2020/0273289 | A1 | 8/2020 | Shigeta | |
| 2020/0294346 | A1 | 9/2020 | Shigeta | |
| 2020/0302168 | A1 | 9/2020 | Vo et al. | |
| 2020/0342281 | A1 | 10/2020 | Shigeta | |
| 2020/0349806 | A1 | 11/2020 | Shigeta | |
| 2020/0349807 | A1 | 11/2020 | Shigeta | |
| 2020/0349808 | A1 | 11/2020 | Shigeta | |
| 2020/0349809 | A1 | 11/2020 | Shigeta | |
| 2020/0349810 | A1 | 11/2020 | Shigeta | |
| 2020/0349811 | A1 | 11/2020 | Shigeta | |
| 2020/0364979 | A1 | 11/2020 | Shigeta | |
| 2020/0372746 | A1 | 11/2020 | Shigeta | |
| 2020/0372752 | A1 | 11/2020 | Shigeta | |
| 2021/0110648 | A1 | 4/2021 | Bucher et al. | |
| 2021/0303897 | A1 | 9/2021 | Kelly et al. | |
| 2021/0304550 | A1 | 9/2021 | Kelly et al. | |
| 2022/0327886 | A1 | 10/2022 | Mathur et al. | |

* cited by examiner

ANIMATING GAMING-TABLE OUTCOME INDICATORS FOR DETECTED RANDOMIZING-GAME-OBJECT STATES

RELATED APPLICATIONS

This patent application claims priority benefit to U.S. Provisional Patent Application No. 63/299,747 filed Jan. 14, 2022. The 63/299,747 Application is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023, SG Gaming Inc.

FIELD OF THE INVENTION

The present invention relates generally to gaming systems, apparatus, and methods and, more particularly, to image analysis and tracking of physical objects in a gaming environment and content projection in the gaming environment.

BACKGROUND

Casino gaming environments are dynamic environments in which people, such as players, casino patrons, casino staff, etc., take actions that affect the state of the gaming environment, the state of players, etc. For example, a player may use one or more physical tokens to place wagers on the wagering game. In another example, a player may perform hand gestures to perform gaming actions and/or to communicate instructions during a game, such as making gestures to hit, stand, fold, etc. In yet another example, a player may move physical cards, dice, gaming props, etc. A multitude of other changes may occur at any given time. To effectively manage such a dynamic environment, the casino operators may employ one or more tracking systems or techniques to monitor aspects of the casino gaming environment, such as credit balance, player account information, player movements, game play events, and the like. The tracking systems may generate a historical record of these monitored aspects to enable the casino operators to facilitate, for example, a secure gaming environment, enhanced game features, and/or enhanced player features (e.g., rewards and benefits to known players with a player account).

Some tracking systems are used in connection with presentation systems that project a portion of gaming content onto a physical surface. For example, some gaming systems track events that occur at a gaming table and also project gaming content onto the gaming table. However, some tracking systems experience challenges. For instance, some tracking systems have trouble tracking some objects at a gaming table, such as moving gaming tokens, interactions with cards or dice, playing gestures, etc. Furthermore, other systems face challenges conforming the shape and/or location of projected objects to specific locations on a gaming table surface. These challenges affect the clarity and accuracy desired of a projection system required to project important gaming information, such as game outcome information.

Accordingly, a new tracking system that is adaptable to the dynamic nature of casino gaming environments is desired.

SUMMARY

According to one aspect of the present disclosure, a gaming system is provided for determining, via image analysis (e.g., via a computer-vision model), an outcome value (e.g., a card value) of a randomizing game object (e.g., a playing card) for a game played at a gaming table and also detecting, based on the outcome value and one or more game rules, an occurrence of a winning outcome for the game. The gaming system can further determine, via image analysis, a location at a gaming table surface related to the winning outcome. The gaming system can further, in response to determining the location, render a virtual-scene overlay having an outcome indicator positioned at pixel coordinates that correspond to the location. The gaming system can further project the virtual-scene overlay at the gaming table. Projecting the virtual-scene overlay causes an image of the outcome indicator to appear at, and in some examples conform to a shape of, the location at the gaming table surface.

Additional aspects of the invention will be apparent to those of ordinary skill in the art in view of the detailed description of various embodiments, which is made with reference to the drawings, a brief description of which is provided below.

Figure 1:
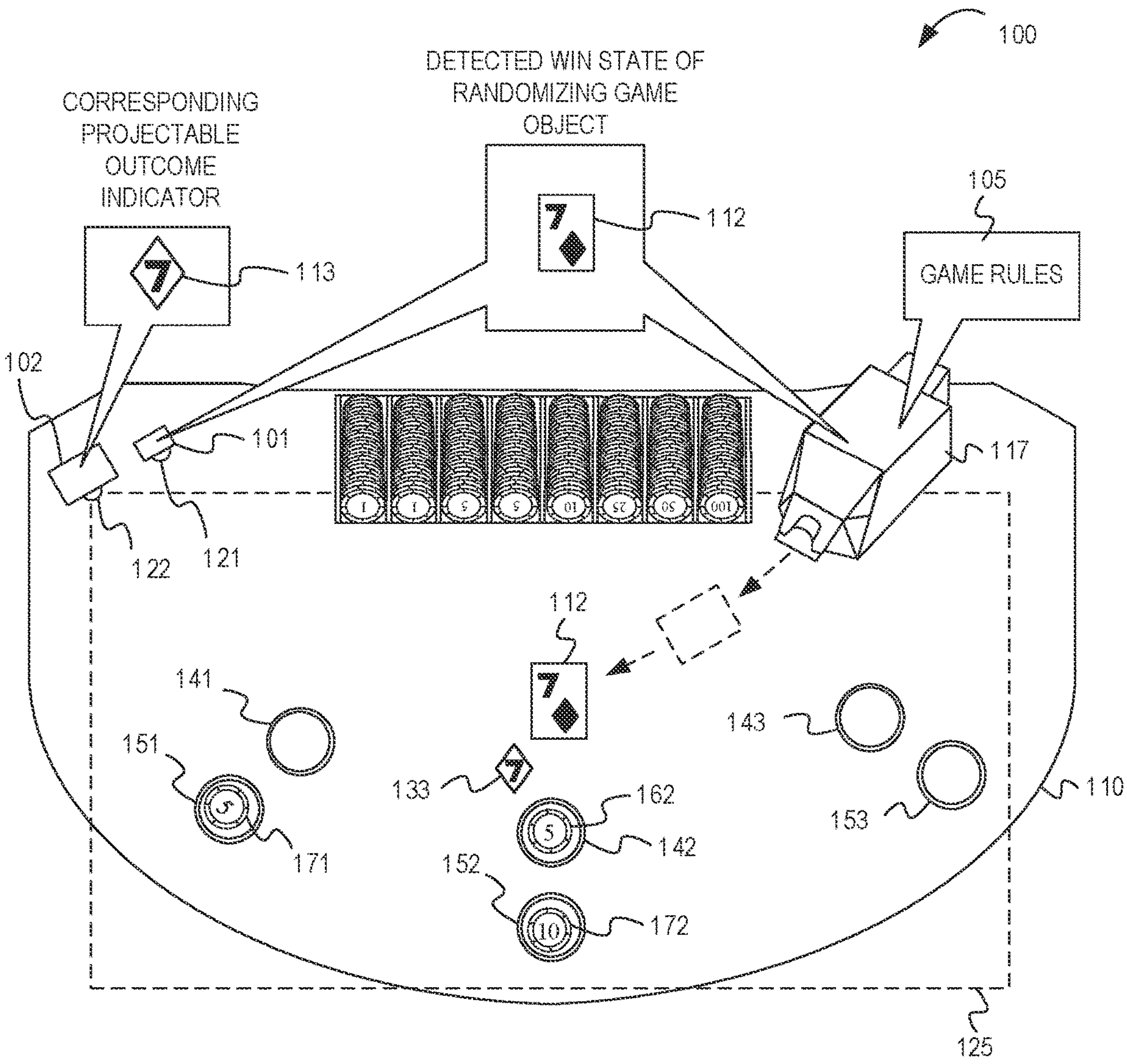
FIG. 1 is a diagram of an example gaming system according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings, and will herein be described in detail, preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.”

For purposes of the present detailed description, the terms “wagering game,” “casino wagering game,” “gambling,” “slot game,” “casino game,” and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Systems and/or methods described herein facilitate tracking of one or more randomizing game objects of a game played at a gaming table, such as tracking, via image analysis, a value of a card that is dealt to, or about to be revealed at, the gaming table. Randomizing game objects (also referred to as “randomizing devices” or “randomizers”) include game objects, or devices, that generate and display (e.g., via indicia) the randomness element of a game of chance. A randomizing game object may include, but is not limited to, one or more of a die, a playing card, a playing tile, a roulette wheel, a numbered ball drawn from a container, a spinning top, etc. In some instances, the system and methods further detect, based on an observed state of the randomizing game object, a winning game outcome (e.g., detecting that a card value indicates a winning game outcome). The system and/or methods further determine, in response to detecting the winning game outcome, a location at a gaming-table surface at which to project an image of an outcome indicator. In some instances, the system and methods further animate the outcome indicator relative to the location. For instance, the system and methods can render, using a machine-learning model, the outcome indicator via a virtual-scene overlay. The system and methods can further instruct a projector to project the virtual-scene overlay so that an image of the outcome indicator appears at the location on the gaming table surface related to the winning outcome.

Animating outcome indicators relative to a location in a gaming environment may facilitate, for example, precise presentation of the gaming content relative to a boundary of a physical object or area at a gaming table. Precise presentation of the outcome indicators reduces possible confusion as to what was presented as a game outcome, thus reducing possible disputes about game outcomes or potential payouts. Further, precise presentation of outcome indicators relative to the boundary of an object increases possibilities for using the object, reliably, as a game play element at which to dynamically project images of wagering game content (e.g., outcome indicators) for a given game state (e.g., for a winning game state).

FIG. 1 is a diagram of an example gaming system 100 according to one or more embodiments of the present disclosure. The gaming system 100 includes a gaming table 110, a camera 101 and a projector 102. The camera 101 captures a stream of images of a gaming area, such as an area encompassing a surface of the gaming table 110. The projector 102 is configured to project gaming content, including images of outcome indicators (e.g., outcome indicator 113). The projector 102 projects the images of the outcome indicator 113 toward the surface of the gaming table 110 relative to objects (in the gaming area) depicted within the captured stream of images. Some examples of objects include printed betting circles (e.g., main betting circles 151, 152, and 153 and secondary betting circles 141, 142, and 143), gaming tokens (e.g., gaming chips 171, 172, and 142), and participant-related items (e.g., hands, arms, smartphone, etc.).

The camera 101 is positioned above the surface of the gaming table 110. The camera 101 has a first perspective (e.g., field of view or angle of view) of the gaming area. The first perspective may be referred to in this disclosure more succinctly as a camera perspective or viewing perspective. For example, the camera 101 has a lens 121 that is pointed at the gaming table 110 in a way that views portions of the surface of the gaming table 110 relevant to game play and that views game participants (e.g., players, dealer, back-betting patrons, etc.) positioned around the gaming table 110. The projector 102 is also positioned above the gaming table 110 and is positioned adjacent to camera 101. The projector has a second perspective (e.g., projection direction, projection angle, projection view, or projection cone) of the gaming area. The second perspective may be referred to in this disclosure more succinctly as a projection perspective. For example, the projector has a lens 122 that is pointed at the gaming table 110 in a way that projects (or throws) images of content onto substantially similar portions of the gaming area that the camera 101 views. In FIG. 1, the projection perspective is framed by boundary 125. In other words, the projector 102 is configured to project the outcome indicator 113 within one or more targeted locations within the boundary 125. Because the lens 121 and 122 are not in the same location, the camera perspective is different from the projection perspective. However, the gaming system 100 can translate or map between the camera perspective and the projection perspective such that they substantially, and accurately, overlay each other (see FIG. 3 for additional details).

As shown in FIG. 1, the gaming environment is dynamic. For instance, the gaming system 100 animates, via projection, game outcome indicators relative to one or more locations at the gaming table 110. For example, a tracking controller (e.g., tracking controller 204 described in FIG. 2) detects a winning state of a randomizing game object, such as a value of the card 112. For instance, if the tracking controller 204 determines, based on game rules 105, that the value of the card 112 results in a winning game outcome, the projector 102 projects images of the outcome indicator 113 toward the surface of the gaming table 110 relative to locations (e.g., objects and or areas) at the gaming table.

In some embodiments, the gaming system 100 further identifies and classifies specific segments of identified objects (e.g., via a machine-learning model such as an image segmentation neural network model). For instance, the gaming system 100 identifies point locations (e.g., edges or corners) of the card 112 that can be segmented.

After identifying and segmenting the object, the gaming system 100 identifies pixels within the captured stream of images that correspond to extents of the segments. In other words, the gaming system 100 identifies an outer boundary of the shape of the card 112 and generates, from that outer boundary, a virtual segmentation mask in the shape of the outer boundary of the card 112. In other examples, the gaming system 110 identifies a boundary of a betting spot, such as a boundary of betting spot 142 at which the gaming token 162 was placed (by a player) as a bet (e.g., on a secondary game). The gaming system 110 can also generate, from the detected boundary of the secondary betting spot 142, an additional mask in the shape of the secondary betting spot 142. The gaming system 100 positions the masks within a virtual scene (e.g., see virtual-scene overlay 425 in FIG. 4B for more details). The virtual-scene overlay is an image of a virtual scene modeled from the projection perspective of the projector 102, which projection perspective is substantially aligned to, and approximately equivalent to, the camera perspective (e.g., see FIGS. 3, 4A, 4B, and 4C for more details). The gaming system 100 further determines, based on the game state and game rules, whether or not an outcome indicator should be animated onto, or relative to, a mask. For instance, the gaming system 100 determines that the card value 112 relates to a winning outcome for a bonus card game that is based on the game rules 105 (e.g., a card with a rank value of "7" results in, or contributes to, a winning outcome for the bonus game according to the game rules 105). In some embodiments, the game rules are stored in a memory associated with the gaming table or in a device associated with the gaming table. For example, as shown in FIG. 1, the game rules 105 may be stored in a memory of the card-handling device 117. Next, the gaming system 100 determines that the outcome indicator 113 corresponds to the winning outcome. The gaming system 100 further determines that because the token 162 was placed in the betting spot 142, then the location associated with the betting spot 162 is eligible for a potential winning outcome in the bonus card game. When the winning outcome occurs (e.g., the card 112 with the rank of "7" is dealt) to the player station associated with the betting spot 142, then the gaming system 100 projects an image 133 of the outcome indicator 113. The image 133 is positioned on a virtual-scene overlay that is projected, as a stream of images, at the gaming table. The image 133 appears at a specific location on the gaming table 110, such as at or near the dealt card 112 and/or at or near the betting spot 142.

Figure 2:
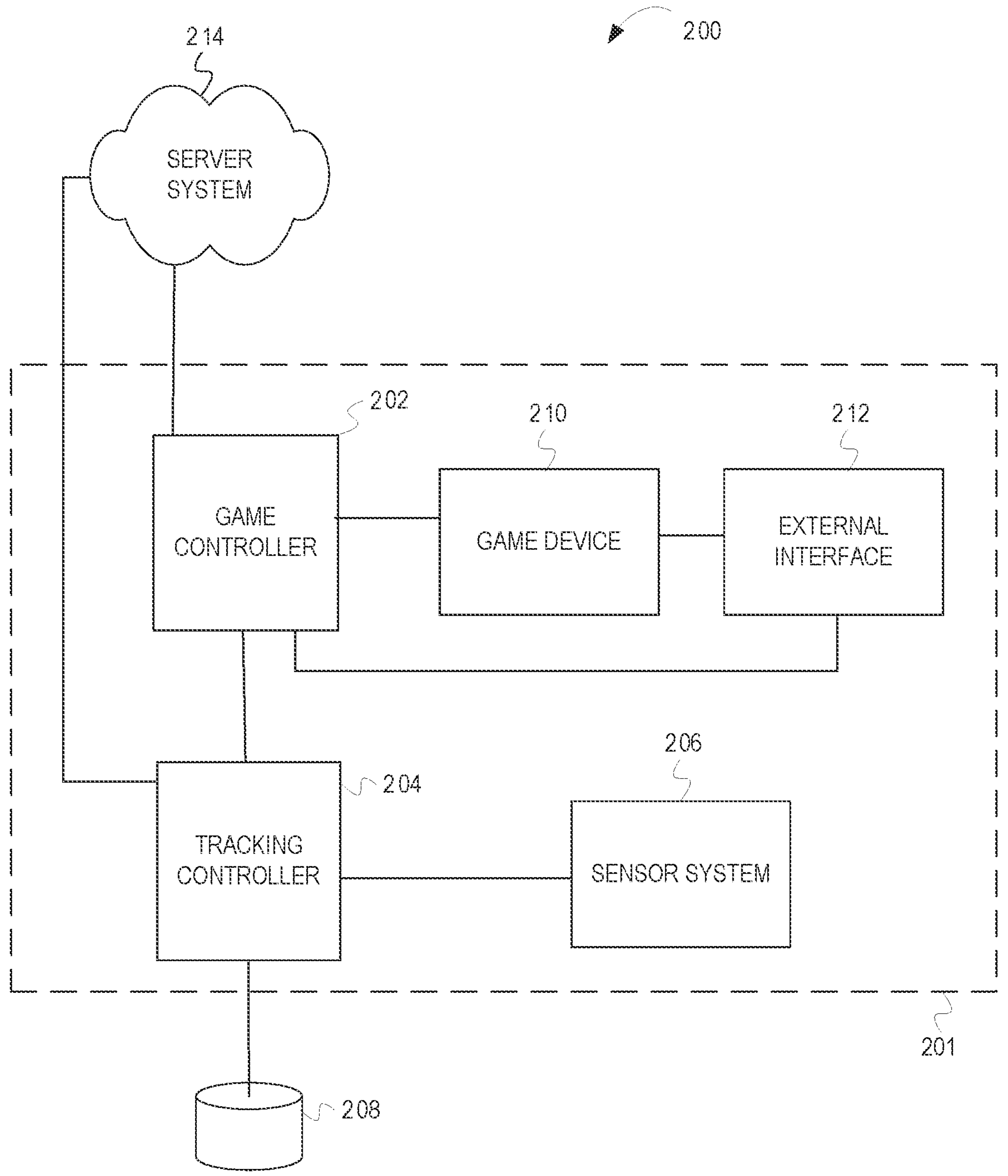
FIG. 2 is a diagram of an exemplary gaming system according to one or more embodiments of the present disclosure.

FIG. 2 is a block diagram of an example gaming system 200 for tracking aspects of a wagering game in a gaming area 201. In the example embodiment, the gaming system 200 includes a game controller 202, a tracking controller 204, a sensor system 206, and a tracking database system 208. In other embodiments, the gaming system 200 may include additional, fewer, or alternative components, including those described elsewhere herein.

The gaming area 201 is an environment in which one or more casino wagering games are provided. In the example embodiment, the gaming area 201 is a casino gaming table and the area surrounding the table (e.g., as in FIG. 1). In other embodiments, other suitable gaming areas 201 may be monitored by the gaming system 200. For example, the gaming area 201 may include one or more floor-standing electronic gaming machines. In another example, multiple gaming tables may be monitored by the gaming system 200. Although the description herein may reference a gaming area (such as gaming area 201) to be a single gaming table and the area surrounding the gaming table, it is to be understood that other gaming areas 201 may be used with the gaming system 200 by employing the same, similar, and/or adapted details as described herein.

The game controller 202 is configured to facilitate, monitor, manage, and/or control gameplay of the one or more games at the gaming area 201. More specifically, the game controller 202 is communicatively coupled to at least one or more of the tracking controller 204, the sensor system 206, the tracking database system 208, a gaming device 210, an external interface 212, and/or a server system 214 to receive, generate, and transmit data relating to the games, the players, and/or the gaming area 201. The game controller 202 may include one or more processors, memory devices, and communication devices to perform the functionality described herein. More specifically, the memory devices store computer-readable instructions that, when executed by the processors, cause the game controller 202 to function as described herein, including communicating with the devices of the gaming system 200 via the communication device(s).

The game controller 202 may be physically located at the gaming area 201 as shown in FIG. 2 or remotely located from the gaming area 201. In certain embodiments, the game controller 202 may be a distributed computing system. That is, several devices may operate together to provide the functionality of the game controller 202. In such embodiments, at least some of the devices (or their functionality) described in FIG. 2 may be incorporated within the distributed game controller 202.

The gaming device 210 is configured to facilitate one or more aspects of a game. For example, for card-based games, the gaming device 210 may be a card shuffler, shoe, or other card-handling device. The external interface 212 is a device that presents information to a player, dealer, or other user and may accept user input to be provided to the game controller 202. In some embodiments, the external interface 212 may be a remote computing device in communication with the game controller 202, such as a player's mobile device. In other examples, the gaming device 210 and/or external interface 212 includes one or more projectors. The server system 214 is configured to provide one or more backend services and/or gameplay services to the game controller 202. For example, the server system 214 may include accounting services to monitor wagers, payouts, and jackpots for the gaming area 201. In another example, the server system 214 is configured to control gameplay by sending gameplay instructions or outcomes to the game controller 202. It is to be understood that the devices described above in communication with the game controller 202 are for exemplary purposes only, and that additional, fewer, or alternative devices may communicate with the game controller 202, including those described elsewhere herein.

In the example embodiment, the tracking controller 204 is in communication with the game controller 202. In other embodiments, the tracking controller 204 is integrated with the game controller 202 such that the game controller 202 provides the functionality of the tracking controller 204 as described herein. Like the game controller 202, the tracking controller 204 may be a single device or a distributed computing system. In one example, the tracking controller 204 may be at least partially located remotely from the gaming area 201. That is, the tracking controller 204 may receive data from one or more devices located at the gaming area 201 (e.g., the game controller 202 and/or the sensor system 206), analyze the received data, and/or transmit data back based on the analysis.

In the example embodiment, the tracking controller 204, similar to the example game controller 202, includes one or more processors, a memory device, and at least one communication device. The memory device is configured to store computer-executable instructions that, when executed by the processor(s), cause the tracking controller 204 to perform the functionality of the tracking controller 204 described herein. The communication device is configured to communicate with external devices and systems using any suitable communication protocols to enable the tracking controller 204 to interact with the external devices and integrates the functionality of the tracking controller 204 with the functionality of the external devices. The tracking controller 204 may include several communication devices to facilitate communication with a variety of external devices using different communication protocols.

The tracking controller 204 is configured to monitor at least one or more aspects of the gaming area 201. In the example embodiment, the tracking controller 204 is configured to monitor physical objects within the area 201, and determine a relationship between one or more of the objects. Some objects may include randomizing game objects (e.g., cards, dice, etc.) and gaming tokens. The tokens may be any physical object (or set of physical objects) used to place wagers. As used herein, the term "stack" refers to one or more gaming tokens physically grouped together. For circular tokens typically found in casino gaming environments (e.g., gaming chips), these may be grouped together into a vertical stack. In another example in which the tokens are monetary bills and coins, a group of bills and coins may be considered a "stack" based on the physical contact of the group with each other and other factors as described herein.

In the example embodiment, the tracking controller 204 is communicatively coupled to the sensor system 206 to monitor the gaming area 201. More specifically, the sensor system 206 includes one or more sensors configured to collect sensor data associated with the gaming area 201, and the tracking system 204 receives and analyzes the collected sensor data to detect and monitor physical objects. The sensor system 206 may include any suitable number, type, and/or configuration of sensors to provide sensor data to the game controller 202, the tracking controller 204, and/or another device that may benefit from the sensor data.

In the example embodiment, the sensor system 206 includes at least one image sensor that is oriented to capture image data of physical objects in the gaming area 201. In one example, the sensor system 206 may include a single image sensor that monitors the gaming area 201. In another example, the sensor system 206 includes a plurality of image sensors that monitor subdivisions of the gaming area 201. The image sensor may be part of a camera unit of the sensor system 206 or a three-dimensional (3D) camera unit in which the image sensor, in combination with other image sensors and/or other types of sensors, may collect depth data related to the image data, which may be used to distinguish between objects within the image data. The image data is transmitted to the tracking controller 204 for analysis as described herein. In some embodiments, the image sensor is configured to transmit the image data with limited image processing or analysis such that the tracking controller 204 and/or another device receiving the image data performs the image processing and analysis. In other embodiments, the image sensor may perform at least some preliminary image processing and/or analysis prior to transmitting the image data. In such embodiments, the image sensor may be considered an extension of the tracking controller 204, and as such, functionality described herein related to image processing and analysis that is performed by the tracking controller 204 may be performed by the image sensor (or a dedicated computing device of the image sensor). In certain embodiments, the sensor system 206 may include, in addition to or instead of the image sensor, one or more sensors configured to detect objects, such as time-of-flight sensors, radar sensors (e.g., LIDAR), thermographic sensors, and the like.

The tracking controller 204 is configured to establish data structures relating to various physical objects detected in the image data from the image sensor. For example, the tracking controller 204 applies one or more machine-learning models (e.g., image neural network models) during image analysis that are trained to detect aspects of physical objects. Neural network models, for example, are analysis tools that classify "raw" or unclassified input data without requiring user input. That is, in the case of the raw image data captured by the image sensor, the neural network models may be used to translate patterns within the image data to data object representations of, for example, tokens, faces, hands, etc., thereby facilitating data storage and analysis of objects detected in the image data as described herein.

At a simplified level, neural network models are a set of node functions that have a respective weight applied to each function. The node functions and the respective weights are configured to receive some form of raw input data (e.g., image data), establish patterns within the raw input data, and generate outputs based on the established patterns. The weights are applied to the node functions to facilitate refinement of the model to recognize certain patterns (i.e., increased weight is given to node functions resulting in correct outputs), and/or to adapt to new patterns. For example, a neural network model may be configured to receive input data, detect patterns in the image data representing objects within the gaming area 201 (e.g., cards), perform image segmentation, and generate an output that classifies one or more portions of the image data as representative of segments of the objects (e.g., a box having coordinates relative to the image data that encapsulates a card, betting spot(s), token(s), hands, etc. and classifies the encapsulated area as a "player station," a "randomizing game object," "gaming token," "human hand" etc.).

For instance, to train a neural network to identify the most relevant guesses for identifying an object, for example, a predetermined dataset of raw image data including image data of the object, and with known outputs, is provided to the neural network. As each node function is applied to the raw input of a known output, an error correction analysis is performed such that node functions that result in outputs near or matching the known output may be given an increased weight while node functions having a significant error may be given a decreased weight. In the example of identifying a human face, node functions that consistently recognize image patterns of facial features (e.g., nose, eyes, mouth, etc.) may be given additional weight. Similarly, in the example of identifying a human hand, node functions that consistently recognize image patterns of hand features (e.g., wrist, fingers, palm, etc.) may be given additional weight. The outputs of the node functions (including the respective weights) are then evaluated in combination to provide an output such as a data structure representing a human face. Training may be repeated to further refine the pattern-recognition of the model, and the model may still be refined during deployment (i.e., raw input without a known data output).

At least some of the neural network models applied by the tracking controller 204 may be deep neural network (DNN)

models. DNN models include at least three layers of node functions linked together to break the complexity of image analysis into a series of steps of increasing abstraction from the original image data. For example, for a DNN model trained to detect human faces from an image, a first layer may be trained to identify groups of pixels that represent the boundary of facial features, a second layer may be trained to identify the facial features as a whole based on the identified boundaries, and a third layer may be trained to determine whether or not the identified facial features form a face and distinguish the face from other faces. The multi-layered nature of the DNN models may facilitate more targeted weights, a reduced number of node functions, and/or pipeline processing of the image data (e.g., for a three-layered DNN model, each stage of the model may process three frames of image data in parallel).

In at least some embodiments, each model applied by the tracking controller 204 may be configured to identify a particular aspect of the image data and provide different outputs such that the tracking controller 204 may aggregate the outputs of the neural network models together to identify physical objects as described herein. For example, one model may be trained to identify cards, while another model may be trained to identify tokens and/or token stacks, while yet another may be trained to detect the bodies of players. In such an example, the tracking controller 204 may link together objects (e.g., link a card to a player station, link a token to a token stack, link a token stack to a betting spot, etc.) by analyzing the outputs of multiple models. In other embodiments, a single DNN model may be applied to perform the functionality of several models.

As described in further detail below, the tracking controller 204 may generate data objects for each physical object identified within the captured image data by the DNN models. The data objects are data structures that are generated to link together data associated with corresponding physical objects. For example, the outputs of several DNN models associated with a player may be linked together as part of a player data object.

It is to be understood that the underlying data storage of the data objects may vary in accordance with the computing environment of the memory device or devices that store the data object. That is, factors such as programming language and file system may vary the where and/or how the data object is stored (e.g., via a single block allocation of data storage, via distributed storage with pointers linking the data together, etc.). In addition, some data objects may be stored across several different memory devices or databases.

In some embodiments, the player data objects include a player identifier, and data objects of other physical objects include other identifiers. The identifiers uniquely identify the physical objects such that the data stored within the data objects is tied to the physical objects. In some embodiments, the identifiers may be incorporated into other systems or subsystems. For example, a player account system may store player identifiers as part of player accounts, which may be used to provide benefits, rewards, and the like to players. In certain embodiments, the identifiers may be provided to the tracking controller 204 by other systems that may have already generated the identifiers.

In at least some embodiments, the data objects and identifiers may be stored by the tracking database system 208. The tracking database system 208 includes one or more data storage devices (e.g., one or more databases) that store data from at least the tracking controller 204 in a structured, addressable manner. That is, the tracking database system 208 stores data according to one or more linked metadata fields that identify the type of data stored and can be used to group stored data together across several metadata fields. The stored data is addressable such that stored data within the tracking database system 208 may be tracked after initial storage for retrieval, deletion, and/or subsequent data manipulation (e.g., editing or moving the data). The tracking database system 208 may be formatted according to one or more suitable file system structures (e.g., FAT, exFAT, ext4, NTFS, etc.).

The tracking database system 208 may be a distributed system (i.e., the data storage devices are distributed to a plurality of computing devices) or a single device system. In certain embodiments, the tracking database system 208 may be integrated with one or more computing devices configured to provide other functionality to the gaming system 200 and/or other gaming systems. For example, the tracking database system 208 may be integrated with the tracking controller 204 or the server system 214.

In the example embodiment, the tracking database system 208 is configured to facilitate a lookup function on the stored data for the tracking controller. The lookup function compares input data provided by the tracking controller 204 to the data stored within the tracking database system 208 to identify any "matching" data. It is to be understood that "matching" within the context of the lookup function may refer to the input data being the same, substantially similar, or linked to stored data in the tracking database system 208. For example, if the input data is an image of a player's face, the lookup function may be performed to compare the input data to a set of stored images of historical players to determine whether or not the player captured in the input data is a returning player. In this example, one or more image comparison techniques may be used to identify any "matching" image stored by the tracking database system 208. For example, key visual markers for distinguishing the player may be extracted from the input data and compared to similar key visual markers of the stored data. If the same or substantially similar visual markers are found within the tracking database system 208, the matching stored image may be retrieved. In addition to or instead of the matching image, other data linked to the matching stored image may be retrieved during the lookup function, such as a player account number, the player's name, etc. In at least some embodiments, the tracking database system 208 includes at least one computing device that is configured to perform the lookup function. In other embodiments, the lookup function is performed by a device in communication with the tracking database system 208 (e.g., the tracking controller 204) or a device in which the tracking database system 208 is integrated within.

Figure 3:
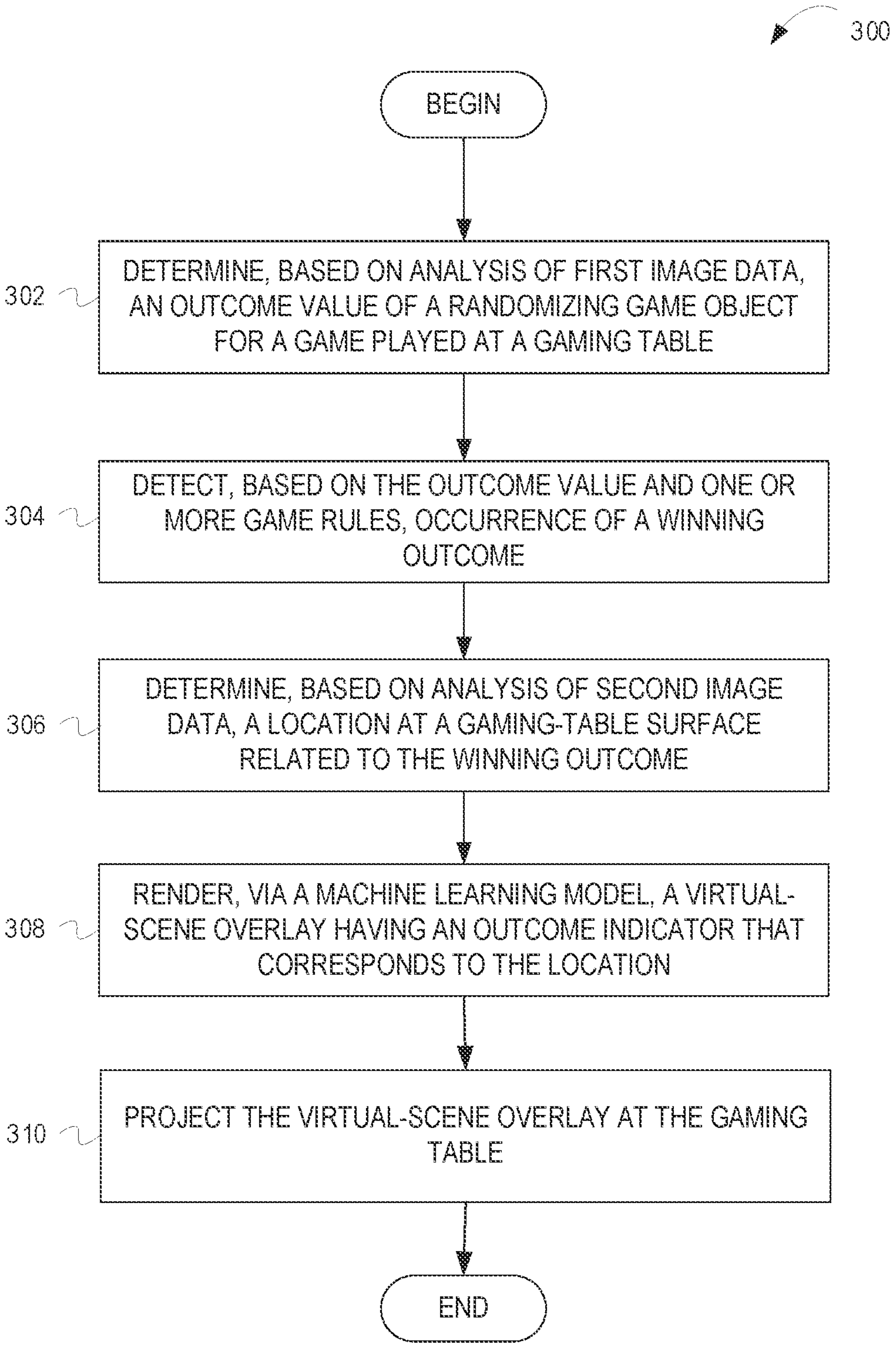
FIG. 3 is a flow diagram of an example method for animating, via projection, game outcome indicators relative to a determined location at a gaming table according to one or more embodiments of the present disclosure.
Figure 4A:
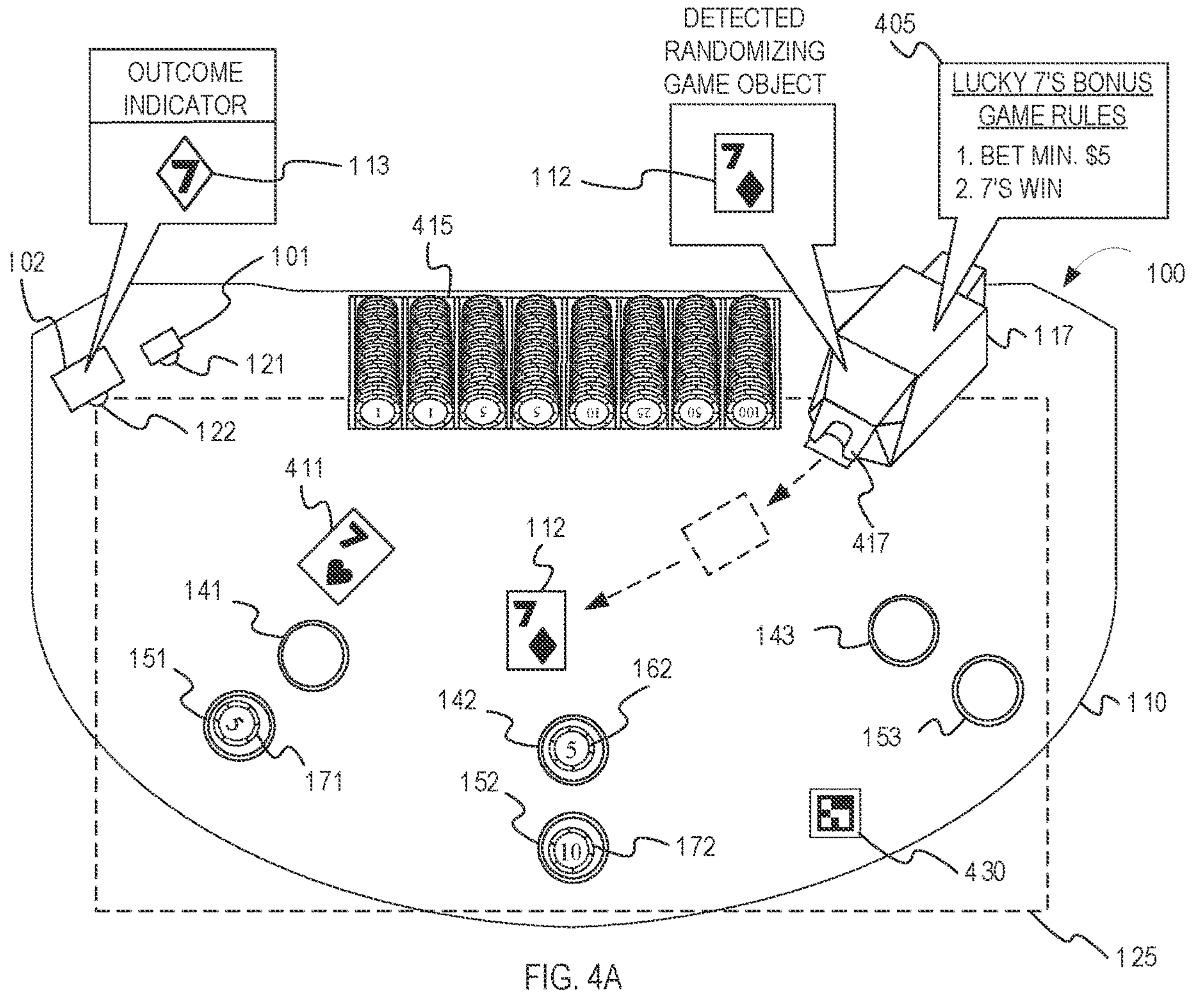
FIGS. 4A, 4B and 4C are diagrams of an exemplary gaming system associated with the data flow shown in FIG. 3 according to one or more embodiments of the present disclosure.
Figure 4B:
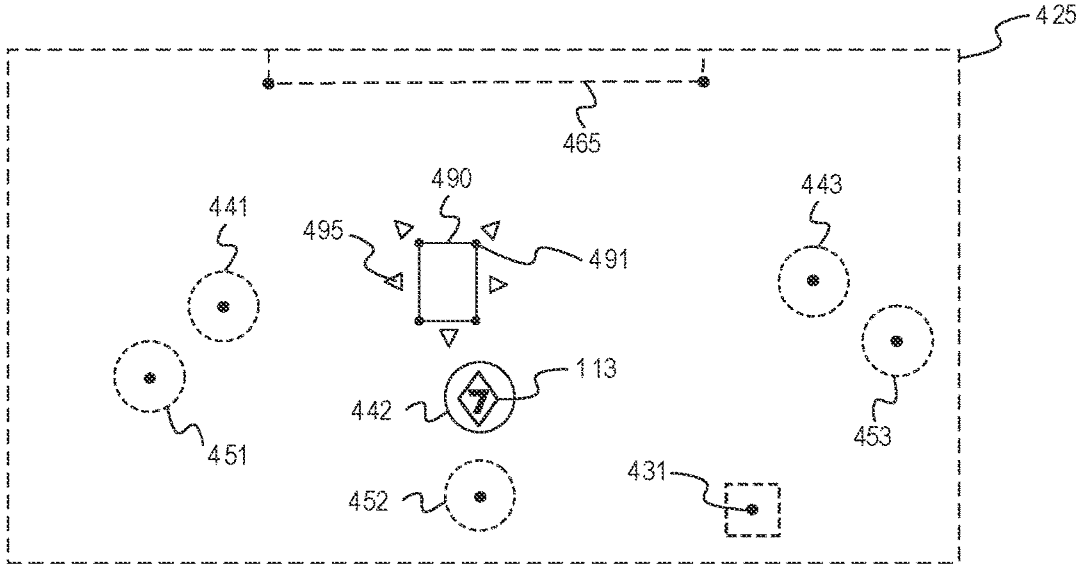
Figure 4C:
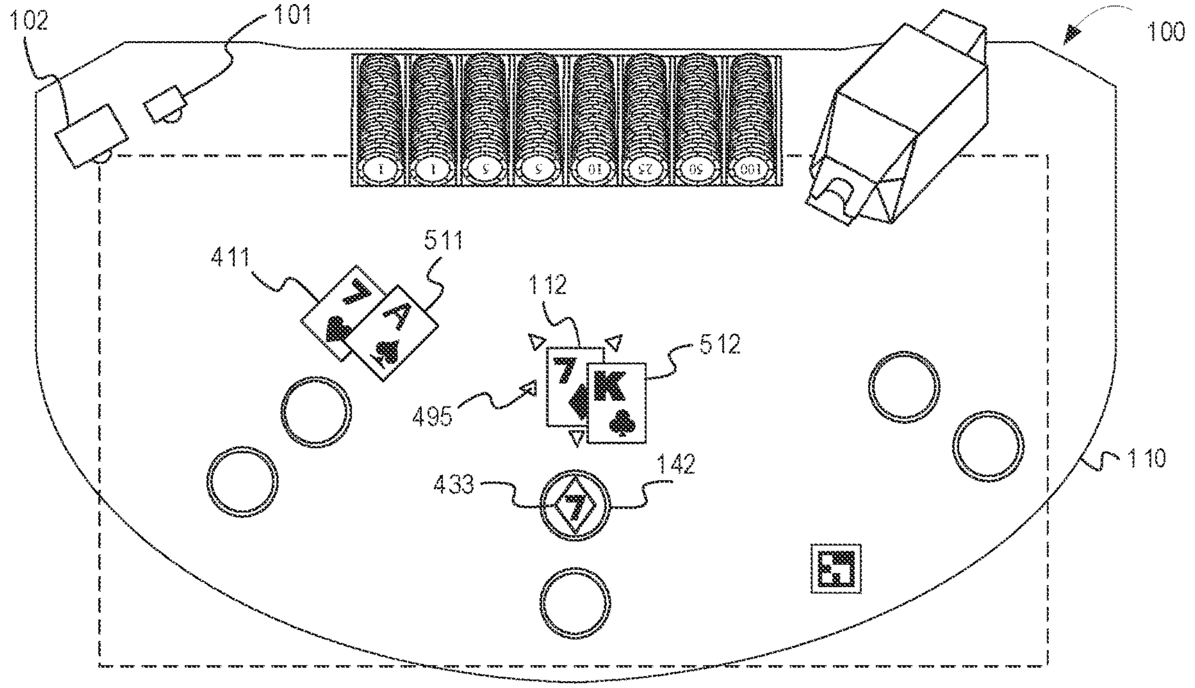

FIG. 3 is a flow diagram of an example method for animating, via projection, game outcome indicators relative to a determined location at a gaming table according to one or more embodiments of the present disclosure. FIGS. 4A, 4B and 4C are diagrams of an exemplary gaming system associated with the data flow shown in FIG. 3 according to one or more embodiments of the present disclosure. FIGS. 4A, 4B and 4C will be referenced in the description of FIG. 3. Furthermore, the flow 300 will refer to a processor. It should be noted that the reference to the processor may refer to the same physical processor or it may be one of a set of a plurality of processors. The set of processors may operate in conjunction with each other and may be distributed across various networked devices. The types of processors may include a central processing unit, a graphics processing unit, any combination of processors, etc. In one embodiment, the processor may refer to the tracking controller 204 (e.g., see FIG. 2), a processor of the dealer terminal 1688 (see FIG. 6), one of the one or more processor(s) 1642 (see FIG. 7), or a processor in another device mentioned herein, such as a processor associated with a card-handling device, a camera controller, a projector controller, a game controller (e.g., game controller 202), a gaming server (e.g., gaming server(s) 1610), etc.

In FIG. 3, a flow 300 begins at processing block 302 where a processor determines, based on analysis of first image data, a card value of a card dealt for a game played at a gaming table. In some embodiments, the processor captures the first image data via a camera of a card-handling device at the gaming table. For example, in FIG. 4A, the card-handling device 117 may include an internal camera positioned to read the face value of the card 112 as the card 112 is queued in a shoe 417. The card 112 becomes queued in the shoe 417 after a previously dealt card (e.g., card 411) was removed from the shoe 417. The card 411, for instance, was dealt to a first player station associated with the betting circles 141 and 151. The first player station has the token 171 in the main betting spot 151, which indicates that a bet was placed on a main game for the table 110, such as a bet on a game of Black Jack. The card 411 may be dealt to the first player station first in order of dealing, such as in accordance with a dealing convention where cards are dealt counter-clockwise on the table starting from the location of the first player station. While the card 411 is being dealt, the card 112 becomes queued in the shoe 417. The processor takes an image of the card 112 in the shoe 417 and analyzes the image card 112, such as via a computer vision model. The computer vision model, for instance, detects, in the image, features of the indicia on the card face. The computer vision model determines, based on known (e.g., ground truth) images of the indicia, the value of the card 112.

Referring again to FIG. 3, the flow 300 continues at processing block 304 where a processor detects, based on the card value and one or more game rules, occurrence of a winning outcome. In one embodiments, the processor compares the detected card value to a listing of win-eligible card values and/or card combinations. The listing is specified in one or more game rules. For example, as in FIG. 4A, a processor accesses and analyzes game rules 405 as well as the image data (captured from the camera in the card-handling device 117 and/or captured from the camera 101). For instance, the processor determines that the game rules 405 specify that a winning outcome for the secondary game requires that (1) a bet is placed in a secondary betting spot, (2) the bet value of the token (or any combined stack of tokens) meets a minimum value (e.g., $5), and (3) that any card dealt to a player station has a rank value of "7." The game rules 405 are for a bonus game offered at the gaming table 110. Each one of the secondary betting spots 141, 142, and 143 is for a bet placed on the bonus game by a different player positioned at one or three different player stations at the table 110. The first player station comprises the main betting spot 151, the secondary betting spot 141, and the general area on the surface of the gaming table 110 within a given distance from the assigned betting spots 141 and 151, such as an area above the secondary betting spot where the player's hand is dealt to the player using cards drawn from the card-handling device 117. The second player station comprises a similar area as related to the main betting spot 152 and the secondary betting spot 142. Likewise, the third player station comprises a similar area as related to the main betting spot 153 and the secondary betting spot 143. For the example of FIGS. 4A, 4B, and 4C, only two players (not shown) are placing bets on the main game (e.g., the Black Jack game) and only one of those players places a bet on the bonus game. For example, the first player placed the gaming token 171 on the main betting spot 151 as an indication that the main game is bet upon. However, the first player did not place a gaming token within the secondary betting spot 141. If the player were to win in the main game, the processor may select and project outcome indicators for winning outcomes of the main game. However, for the example shown in FIGS. 4A, 4B, and 4C, embodiments are described in context of the secondary game.

For instance, a processor can detect that the token 162 was placed in the secondary betting spot 142 using image analysis of environmental image data captured by the camera 101. The camera 101 may be referred to herein as a table camera, and is different from the camera of the card-handling device. In FIG. 4A, the camera 101 takes images, from the camera perspective, of the surface of the gaming table 110. The settings of the camera 110 are configured so that the viewing perspective of the camera approximates, in viewing area, that of the projection area (e.g., boundary 125) of the projection perspective. A processor analyses the image data taken from the camera 110 and detects the token 162 in the secondary betting spot 142. The processor can use a machine-learning model to detect betting spots, tokens, or other objects on the gaming table similar to the techniques described in U.S. patent application Ser. No. 17/319,904, filed May 13, 2021, and/or in U.S. patent application Ser. No. 17/319,841, filed May 13, 2021 which patent applications are hereby incorporated by reference herein in their respective entireties. Still referring to FIG. 4A, the processor detects the token 162 within the secondary betting spot 142 and, thus, determines that the second player station is eligible for a potential win in the secondary game (and also determines that first player station and the third player station are not eligible locations at the gaming table for a potential winning outcome in the secondary game).

In response to the processor detecting that the secondary betting spot 142 includes the token 162 as a bet on the secondary game, the processor further determines (based on analysis of the game rules 405), whether the card value of the card 112 would result in a winning outcome for the game. For example, the processor analyzes the image data taken from the camera in the card-handling device 117 and determines that the value of the card 112 includes a rank of "7." The processor further determines that the card 112 (having the rank of "7") is about to be dealt to the second player station. The processor can determine that the winning outcome has occurred before the card 112 is dealt and/or the face value revealed to the player. For instance, as mentioned, the card 112 is queued in the shoe 417 for a certain period of time before it is dealt. The processor, analyzes the environmental image data of the gaming table 110 and determines, based on the placement of the tokens 171, 172, and 162, to which player station the card 112 will be dealt next. For example, the card 411 was dealt, according to a known dealing convention, to the first player station. Thus, the card 112, which is queued in the shoe 417 will, according to the dealing convention, be dealt to the next player station in the dealing order, which is the second player station. Therefore, the processor determines that a winning outcome will occur for the second player station as soon as the card 112 is revealed. In some embodiments, the processor detects the occurrence of the winning outcome for the game by determining that the card value 112 combines with one or more additional card values of cards already dealt to the second player station to form a winning card combination specified by the one or more game rules.

Referring again to FIG. 3, the flow 300 continues at processing block 306 where a processor determines, based on analysis of second image data, a location at a gaming-table surface related to the winning outcome. For example, as in FIG. 4A, the processor determines the location associated with the winning outcome based on analysis of the environmental image data captured by the camera 101. As mentioned, the processor can use a machine-learning model to detect betting spots, tokens, cards, or other objects on the gaming table similar to the techniques described in the U.S. patent application Ser. No. 17/319,904 and/or in the U.S. patent application Ser. No. 17/319,841. In one example, the processor can determine a location on the surface of the gaming table 110 in relation to a known position and/or known dimensions of specific objects on the gaming table 110, such as for fiducial marker 430 or chip tray 415, both of which remain in known stationary positions of the gaming table 110.

In some embodiments, a processor identifies a shape of an object depicted in the environmental image data (taken from camera 101) and stores a location of pixels associated with the object (e.g., pixels associated with features of the object) as being a location on the gaming table surface associated with a given player station. In response to determining that a winning outcome is related to a player station, the processor also determines that any of the locations of the objects at the player station can be considered locations associated with the winning outcome. As mentioned in FIG. 2, in one embodiment, one or more machine-learning models, such as image neural network models, are implemented to analyze captured images. In one embodiment, the machine-learning model is trained according to training images of one or more objects positioned at various locations and/or relative to specific physical features of on the gaming-table surface, with different orientations, and under different lighting conditions. The machine-learning model is trained to detect the objects relative to the various locations and/or features of the gaming-table surface (including the features of the fiducial marker 430 printed on a covering on the gaming-table surface and/or including the features of the chip tray 414). The training images are taken via the viewing perspective of the table camera 101. The machine-learning model learns to detect the objects within a certain degree of accuracy. The machine-learning model can further store, as ground truth, data pertaining to objects and/or features that are detected within the degree of accuracy.

In some embodiments, at least some of the training images display at least one playing card having dimensions equivalent to that of the card 112. Thus, in some embodiments, the machine-learning model is trained to detect, via feature extraction, one or more point locations of physical features of the card relative to a frame of the image data. In some examples, several neural network models can be implemented together by a tracking controller (e.g., tracking controller 204 shown in FIG. 2) to extract different features from the image data. That is, the neural network models may be trained to identify particular characteristics of physical objects. For example, one neural network model may be trained to identify randomizing game objects (e.g., cards, dice, etc.), while another neural network model may be trained to identify human body parts (e.g., fingers, hands, arms, face, torso, etc.), while yet another neural network model may be trained to identify gaming tokens, and so forth. Although the output of the image neural network models may vary depending upon the specific functionality of each model, the outputs generally include one or more data elements that represent a physical feature or characteristic of a person or object in the image data in a format that can be recognized and processed by a tracking controller and/or other computing devices. For example, one example neural network model may be used to detect a playing card in the image data and output a map of data elements representing "key" physical features of the detected card, such as the position of corners, edges, or a center point in relation to each other and/or in relation to set features of the table (e.g., in relation to the fiducial marker 430 or in relation to the features of the chip tray 415). The map may indicate a relative position of each card feature within the space defined by the image data (in the case of a singular, two-dimensional image, the space may be a corresponding two-dimensional plane) and cluster several card features together to distinguish between detected cards. The output map is a data abstraction of the underlying raw image data that has a known structure and format, which may be advantageous for use in other devices and/or software modules. In the example embodiment, a processor applies the image neural network model(s) to the image data and generates one or more key data elements as the outputs of the image processing (including the models). The key data elements may include any suitable amount and/or type of data based at least partially on the corresponding neural network model. At least some of the key data elements include position data indicating a relative position of the represented physical characteristics within a space at least partially defined by the scope of the image data. Key data elements may include, but are not limited to, boundary boxes, key feature points, vectors, wireframes, outlines, pose models, and the like. Boundary boxes are visual boundaries that encapsulate an object in the image and classify the encapsulated object according to a plurality of predefined classes (e.g., classes may include "card," "betting spot," "token," "token stack," etc.). A boundary box may be associated with a single class or several classes (e.g., a card may be classified as both a "main game" and a "secondary game" randomizing game object). The key feature points, similar to the boundary boxes, classify features of objects in the image data, but instead assign a singular position to the classified features.

After the key data elements are generated, the processor is configured to organize the key data elements to identify each respective physical object. That is, the processor may be configured to assign the outputs of the neural network models to a particular object based at least partially on a physical proximity of the physical characteristics represented by the key data elements to each other.

In some embodiment, a processor is configured to generate, based on key token data elements, identifiers, such as a player identifier, a player station identifier, an area identifier, a card identifier, a token identifier for a token stack, and so forth. For instance, a token identifier uniquely identifies a token stack. The token identifier may be used to link the token stack to a player identifier. The tracking controller may generate other data based on the key token data elements and/or other suitable data elements from external systems and/or sensor systems. The token identifier may be assigned to a token stack on a temporary basis. That is, the token stack may change over time (e.g., the addition or removal of tokens, splitting the stack into smaller sets, etc.), and as a result, the features indicated by the key token data elements to distinguish the token stack may not remain fixed. Some identifiers may expire after a period of time based on their need. For example, during one game, an identifier may be assigned to a single card for the duration of the game. In another example, token identifiers may expire within a day (e.g., to ensure a pool of token identifiers are available for newly detected token stacks or sets). Other identifiers, such as player identifiers that may expire after a longer period, such as anonymized player identifiers, which may expire after a relatively extended period of time (e.g., two weeks to a month).

In at least some embodiments, a processor is configured to generate one or more tracking messages to be transmitted to one or more external devices or systems. More specifically, the functionality of other systems in communication with the processor may be enhanced and/or dependent upon data from the processor. In the example embodiment, the tracking message is transmitted to a server (e.g., server system 214 shown in FIG. 2). The tracking messages are data structures having a predetermined format such that the processor and a recipient of the tracking message can distinguish between data elements of the tracking message. The contents of the tracking messages may be tailored to the intended recipient of the tracking message, and tracking messages transmitted to different recipients may differ in the structure and/or content of the tracking messages.

In one example, a player account system in communication with the processor may receive the tracking message to identify any players with player accounts present within the gaming environment monitored by the processor.

In some embodiments, the gaming system analyzes multiple images, over time. For instance, the gaming system may, for a first frame of image data (captured at a first time), generate a boundary box for a physical object, then use the boundary box for a second frame of image data (captured at a second time after the first time). The boundary box may be a visual or graphical representation of one or more underlying key token data elements. For example, and without limitation, the key token data elements may specify coordinates within the frames for each corner of the boundary box, a center coordinate of the boundary box, and/or vector coordinates of the sides of the boundary box. Other key token data elements may be associated with the boundary box that are not used to specify the coordinates of the boundary box within the frames, such as, but not limited to, classification data (i.e., classifying the object in the frames as a "winning card") and/or value data (e.g., identifying a value of the winning card).

In at least some embodiments, the tracking controller is configured to generate annotated image data. The annotated image data may be the image data with at least the addition of graphical and/or metadata representations of the data generated by the processor. For example, if the processor generates a bounding box encapsulating a card, a graphical representation of the boundary box may be applied to the image data to represent the generated boundary box. The annotated image data may be an image filter that is selectively applied to the image data or an altogether new data file that aggregates the image data with data from the processor. The annotated image data may be stored as individual images and/or as video files. The annotated image data may be stored in a database (e.g., tracking database system 208) as part of the historical object data.

In other examples, other suitable image processing techniques and tools may be implemented by the processor in place of, or in combination with, the neural network models. For example, a 3D camera (e.g., of the sensor system 206 shown in FIG. 2) may generate a depth map that provides depth information related to the image data such that objects may be distinguished from each other and/or classified based on depth. Some key data elements may be generated from the depth map. In another example, a LIDAR sensor (e.g., of the sensor system 206) may be configured to detect objects to generate kay data elements.

In some embodiments, the processor performs image segmentation to analyze and identify parts of a captured image and understand what object the parts belong to. Image segmentation involves dividing a visual input into segments. Segments represent objects or parts of objects, and comprise sets of pixels, or "super-pixels." Image segmentation sorts pixels into larger components, which eliminates the need to consider each pixel as a unit of observation. In other words, image segmentation involves drawing the boundaries of the objects within an input image at the pixel level. This can help achieve object detection tasks in real-world scenarios and differentiate between multiple similar objects in the same image. Different image segmentation techniques can be used, such as semantic segmentation or instance segmentation. Semantic segmentation detects objects within the input image, isolates them from the background and groups them based on their class. Instance segmentation takes this process a step further and detects each individual object within a cluster of similar objects, drawing the boundaries for each of them. There are many ways to perform image segmentation, including Convolutional Neural Networks (CNN), Fully Convolutional Networks (FCN), and frameworks like DeepLab and SegNet. Other examples of ways to perform image segmentation includes utilizing motion based segmentation, edge detection image processing, thresholding, k-means clustering, compression-based segmentation, histogram-based segmentation, dual clustering, region-growing (e.g., statistical region merging, seeded region growing, unseeded region growing, split-and-merge segmentation), partial differential equation (PDE) methods (e.g. parametric methods, level-set methods, fast marching methods), variational methods (e.g., graduated non-convexity and Ambrosio-Tortorelli approximation), graph partitioning methods (e.g. Markov random fields, Maximum a posteriori estimation, optimization algorithms, iterated conditional modes/gradient descent, simulated annealing (SA)), watershed transformation, and so forth.

In some embodiments, the processor uses one or more first machine-learning models to detect objects and a second machine-learning model to perform segmentation. For example, the camera 101 captures a stream of images at a first resolution having a high degree of pixels, such as at full HD (i.e., 1920×1080). The processor uses the one or more first machine-learning model to detect specific objects within the captured a stream of images, such as for example specific randomizing game objects (e.g., cards, dice, etc.) and/or related locations or features at the table (e.g., bet spots, markers, etc.). Once detected, the one or more first machine-learning models generates one or more bounding boxes around the detected objects. The processor then crops (according to the bounding boxes) the portion of the detected objects from the high-resolution stream of images and pastes them into a file that includes only the cropped portions. The processor then provides, as input, the file of cropped images to the second machine-learning model according to a lower resolution target input requirement. The second machine-learning model generates the segmentation mask(s) on the already detected, and cropped, object images. An example of cropping content from a higher-resolution image and fitting it to a target input requirement is described in detail in U.S. patent application Ser. No. 17/217,090, filed Mar. 30, 2021, which is hereby incorporated by reference in its entirety. In some embodiments, the processor reduces the image resolution of the cropped images to comport with the lower resolution setting for the target input requirement.

Thus, the processor uses a two-pass method, where the first pass is the one or more first machine-learning models that use the high resolution images to accurately detect the objects (according to higher resolution pixel edges) and ensure that all of the pixels of the detected object are found within the bounding box. Because the objects were detected at the higher resolution and are contained to the bounding boxes by the one or more first machine-learning models, then the second machine-learning model can preserve resources by not having to detect or identify the object from a larger image that contains the entire field of view of the gaming table 110 as captured by the camera 101. Rather, the second machine-learning model receives, as input, the identification of the object in a cropped rectangular bounding box. Consequently, the second machine-learning model, already knowing the type of object as input from the first machine-learning model, can, even with a lowered resolution in the cropped images, more accurately find the edges of the object for the mask segmentation in the cropped images.

Referring back to FIG. 3, the flow 300 continues at processing block 308 where a processor renders a virtual-scene overlay having outcome indicator. A position of the outcome indicator on the virtual-scene overlay corresponds to the location that is related to the winning outcome. In one embodiment, the processor renders the virtual-scene overlay by transforming, via a machine-learning model, one or more point locations of the captured image data into isomorphically equivalent points on the virtual-scene overlay that correspond to pixel coordinates. In one embodiment, the processor generates a virtual segmentation mask for the one or more objects depicted on stream of images taken from a table camera. The virtual-scene overlay is a transparent image overlay that is superimposed over the stream of captured images. The virtual-scene overlay is also a stream of images generated by the machine-learning model with virtual objects drawn thereon, such as boundary boxes, annotations, identifiers, masks, gaming content, outcome indicators, and so forth. The machine-learning model maps the position of the virtual objects to the pixels of the table camera feed that correspond to the win-related locations. The machine-learning model generates a virtual scene with a virtual camera having a perspective that is modeled according to the viewing perspective of the table camera (with pixel coordinate offsets that translate to the projection perspective). For example, the machine-learning model draws a mask at pixel coordinates that correspond to the location of winning outcome. In some embodiments, the machine-learning model draws the virtual object, such as the outcome indicator on the segmentation mask. In other embodiments, the machine-learning model draws an outcome indicator (or other virtual object) at a position that is not directly on the pixels of the mask, but rather at a location within a given distance (e.g., with a given pixel range) to the mask.

In some embodiments, the machine-learning model maps position of the virtual objects to the pixels of the table camera feed that correspond to the win-related locations via geometric transformations, also referred to as transforming. In some examples, transforming involves geometrically rotating, translating, or scaling of point locations using one or more of a homography transformation, an affine transformation, a projective transformation matrix, a linear transformation, or a barycentric transformation.

In some embodiments, the gaming system utilizes a projection transformation algorithm that translates from the camera perspective to the projector perspective. Mapping is based on the intrinsics of the camera (e.g., the amount of distortion of the particular type of lens of the camera), the intrisincs of the projector (e.g., the amount of distortion of the particular type of lens of the projector), and a parallax off-set effect that occurs in fields of view of the camera and the projection perspective based on a distance between the camera lens and the projector lens. In some instances, a tracking controller detects the location of pixelated segmentation boundaries in the captured images and creates a mask of the object at corresponding locations of the virtual scene. The mask conforms to a boundary of the shape of the object depicted in the captured image. The boundary is at the pixel level and, therefore, provides a detailed shape of the edges of a physical object. The pixel-level edge of the physical object is used as reference to draw edges of the mask.

In one example, as in FIG. 4B, the processor detects, from visual analysis of the images captured by camera 101, that the card 112 is positioned at the second player station. The processor detects point locations 491 for the card 112 and generates, via the machine-learning model, a mask 490 that conforms to the extents of the card 112. The mask 490 includes a boundary whose pixels are positioned at locations within a boundary, or frame, of the virtual-scene overlay 425 that corresponds to locations of the pixels in the captured image that correspond to the card 112. For example, the machine-learning model positions outcome-indicators 495 around the mask 490 to highlight the winning card 112. In some embodiments, the machine-learning model determines a position for the outcome indicators relative to a detected center point 431 of the fiducial marker 430 and/or relative to other detected features of the fiducial marker (e.g., corner points). In some embodiments, the machine-learning model can also position an outcome indicator relative to other point locations, such as the point locations related a boundary box 465 that corresponds to the chip tray 414, and other with point locations (e.g., center points) of boundary circles 441, 451, 452, 443, and/or 453 related to betting spots 141, 151, 152, 143, and 153 respectively.

In some embodiments, the processor modifies a visual property of an outcome indicator to conform to a shape of a segmentation mask. For example, in FIG. 4B, the machine-learning model generates a mask 442 whose boundary corresponds to the location of the circular boundary of the secondary betting spot 142. The machine-learning model shapes the outcome indicator 113 to fit within the boundary of the mask 442, thus positioning the outcome indicator 113 at pixel coordinates that correspond to location of the image of the secondary betting spot 142. Furthermore, in some embodiments, the machine-learning model generates and/or modifies an appearance of an outcome indicator to match indicia of the randomizing game object that resulted in the winning outcome. For example, the machine-learning model selects as the outcome indicator 113 an image of a "7" inside of a diamond shape to reflect the indicia on the card 112 (e.g., the "7" of Diamonds).

Other examples of outcome indicators (and/or other outcome-related content) may include an effect that surrounds a card, such as glow around a particular card (e.g., a winning card) that had been dealt. The glow can appear prior to the card being revealed. For example, a card can be dealt face down. A red color can be mapped to, and projected around, the border of the card. If the card is revealed as a winner, then the red color changes to a green color to indicate a winning outcome. Other examples of outcome-related indicators may include indicators for games having complicated rules, such as arrows pointing at or around certain cards, artwork on the signage display can indicate the way cards are being dealt, effects to indicate how the game is paid, etc. This is similar to in a slot machine where there are line indicators to indicate a win in a game. A line, or other markers, can be projected across certain winning cards.

Furthermore, as shown in FIG. 4B, the gaming system 400 can track the motion and/or position of additional cards as they are dealt, and or other objects that may enter the viewing perspective of the camera, such as motion and/or locations of the cards 511 and 512 (e.g., see FIG. 4C for more details).

Referring again to FIG. 3, the flow 300 continues at processing block 310 where a processor projects, via a projector, the virtual-scene overlay at the gaming table. For example, FIG. 4C illustrates an appearance of the images of outcome indicators 495 and 433 when the projector 102 projects the virtual-scene overlay 425. In FIG. 4C, the projector 102 projects the overlay until the game is concluded and after the bets have been collected (for losing player stations) and/or paid off (to winning player stations). In FIG. 4C, the image 433 of the outcome indicator 113 projects at the gaming-table surface and appears within the circular boundary of the secondary betting spot 142. The image 433 may continue to project until after the tokens have been removed from the table 110. In some embodiments, a processor determines, based on image data from the camera 101, that the additional cards 511 and 512 were dealt and placed partially over and/or adjacent to the cards 411 and 112. The processor can further determine that the position of the card 512 overlaps the location of the card 112, and thus interferes with presentation of a portion of the projected image of outcome indicator 495 related to the card 112. Therefore, the processor removes, or masks out, any portion of the outcome indicator 495 that corresponds to pixels related to the card 512. An example of masking a portion of projected content is described in detail in U.S. patent application Ser. No. 17/217,172, filed Mar. 30, 2021, which is hereby incorporated by reference in its entirety.

In some embodiments, the processor times the projection of the virtual-scene overlay 495 to dynamically respond to the revealing of the card 112. For example, in one embodiment, the processor detects, in response to analysis of the image data from the table camera 101, a moment when the card 112 is placed face up on the surface of the gaming table 110. The processor detects, via the image analysis, the moment that the card value is revealed (e.g., placed faced up). The processor, thus, projects the virtual-scene overlay 425 in response to detecting the moment that the card is placed face up.

In other embodiments, instead of timing the projection of the virtual-scene overlay 495 to respond to the revealing of the card 112, the processor can estimate a time period to pause (e.g., a waiting period) before projecting the virtual-scene overlay 425. For example, the waiting period is measured from a first moment that the winning outcome is detected (e.g., from the moment when the card value is detected while the card 112 is queued in the shoe 417 and) to a second moment when the virtual-scene overlay is projected via the projector. Estimating the time period can be based on card-distribution rules, a dealing speed, and/or a distance of a win-related location from a card-distribution device. For example, as described in FIG. 4A, when the card 112 is queued in the shoe 417, the processor determines that the card 112 value results in a winning outcome and also determines that the card 112 will be dealt to the location of the second player station. For example, a processor (e.g., a projection controller) estimates, based on various game-play factors, a given amount of time to wait after detecting the card value for the card 112 before projecting the images of outcome indicators. The waiting period gives the dealer sufficient time to place and reveal the card value at the gaming table. For example, processor waits a certain amount of time (waiting period) based on a dealer's speed of dealing before projecting the one or more outcome indicators. For example, the processor can determine (e.g., via computer vision observations of a dealer's dealing speed) that it takes approximately a given amount of seconds (e.g., a range between 0.5 seconds and one second) for a card to be dealt (e.g., to be moved from the shoe 417 to the placement of the card 112 on the table 110). The waiting period can also depend on the distance of the player stations (also referred to a player terminals) to the card-handling device 117 and/or shoe 417. For example, one player station may be closest to the card-handling device 117, whereas another may be furthest from the card-handling device 117. The processor can determine, based on the distances, the first number of seconds to deal to the closest eligible dealing location (e.g., it takes 0.5 seconds to deal to the closest player station) and a second number of seconds to deal to the furthest eligible dealing location (e.g., it takes 1 second to deal to the further player station). Thus, in one embodiment, the dealer terminal can offset the waiting period for each of the different distances according to the amount of time required to deal to a particular eligible dealing location. In other embodiments, however, the processor uses the longest determined value (e.g., the 1 second value) as the waiting period for each card dealt to each eligible location will be dealt.

Figure 5:
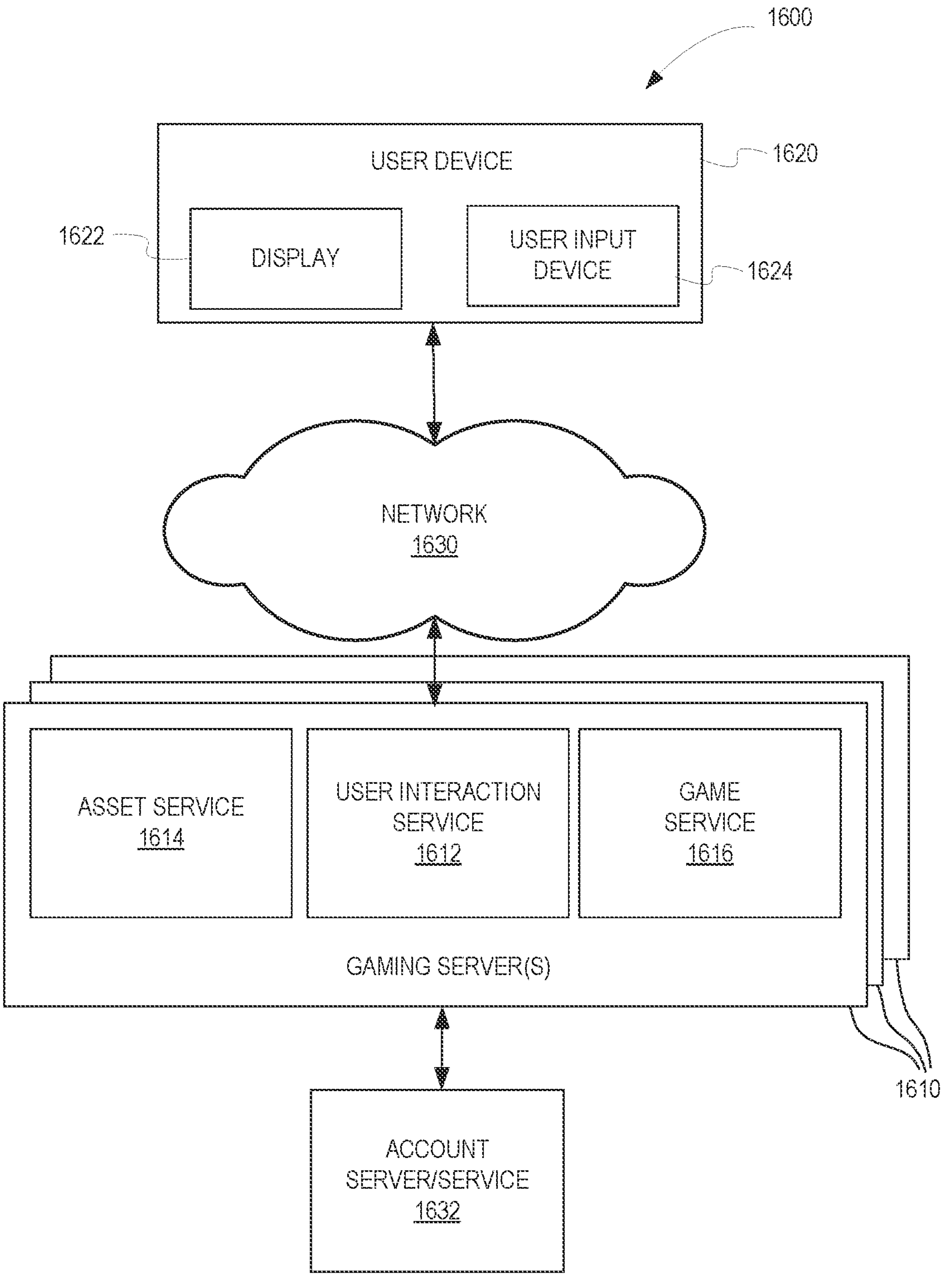
FIG. 5 is a schematic block diagram of a gaming system for implementing embodiments of wagering games in accordance with this disclosure.

FIG. 5 is a schematic block diagram of an illustrative gaming system 1600 for implementing wagering games according to this disclosure. In some embodiments, wagering games in accordance with this disclosure may be administered using a gaming system employing a client-server architecture (e.g., over the Internet, a local area network, etc.). The gaming system 1600 may enable end users to remotely access game content. Such game content may include, without limitation, various types of wagering games such as card games, dice games, big wheel games, roulette, scratch off games ("scratchers"), and any other wagering game where the game outcome is determined, in whole or in part, by one or more random events. This includes, but is not limited to, Class II and Class III games as defined under 25 U.S.C. § 2701 et seq. ("Indian Gaming Regulatory Act"). Such games may include banked and/or non-banked games.

The wagering games supported by the gaming system 1600 may be operated with real currency or with virtual credits or other virtual (e.g., electronic) value indicia. For example, the real currency option may be used with traditional casino and lottery-type wagering games in which money or other items of value are wagered and may be cashed out at the end of a game session. The virtual credits option may be used with wagering games in which credits (or other symbols) may be issued to a player to be used for the wagers. A player may be credited with credits in any way allowed, including, but not limited to, a player purchasing credits; being awarded credits as part of a contest or a win event in this or another game (including non-wagering games); being awarded credits as a reward for use of a product, casino, or other enterprise, time played in one session, or games played; or may be as simple as being awarded virtual credits upon logging in at a particular time or with a particular frequency, etc. Although credits may be won or lost, the ability of the player to cash out credits may be controlled or prevented. In one example, credits acquired (e.g., purchased or awarded) for use in a play-for-fun game may be limited to non-monetary redemption items, awards, or credits usable in the future or for another game or gaming session. The same credit redemption restrictions may be applied to some or all of credits won in a wagering game as well.

An additional variation includes web-based sites having both play-for-fun and wagering games, including issuance of free (non-monetary) credits usable to play the play-for-fun games. This feature may attract players to the site and to the games before they engage in wagering. In some embodiments, a limited number of free or promotional credits may be issued to entice players to play the games. Another method of issuing credits includes issuing free credits in exchange for identifying friends who may want to play. In another embodiment, additional credits may be issued after a period of time has elapsed to encourage the player to resume playing the game. The gaming system 1600 may enable players to buy additional game credits to allow the player to resume play. Objects of value may be awarded to play-for-fun players, which may or may not be in a direct exchange for credits. For example, a prize may be awarded or won for a highest scoring play-for-fun player during a defined time interval. All variations of credit redemption are contemplated, as desired by game designers and game hosts (the person or entity controlling the hosting systems).

The gaming system 1600 may include a gaming platform to establish a portal for an end user to access a wagering game hosted by one or more gaming servers 1610 over a network 1630. In some embodiments, games are accessed through a user interaction service 1612. The gaming system 1600 enables players to interact with a user device 1620 through a user input device 1624 and a display 1622 and to communicate with one or more gaming servers 1610 using a network 1630 (e.g., the Internet). Typically, the user device is remote from the one or more gaming servers 1610 and the network is the word-wide web (i.e., the Internet).

Figure 6:
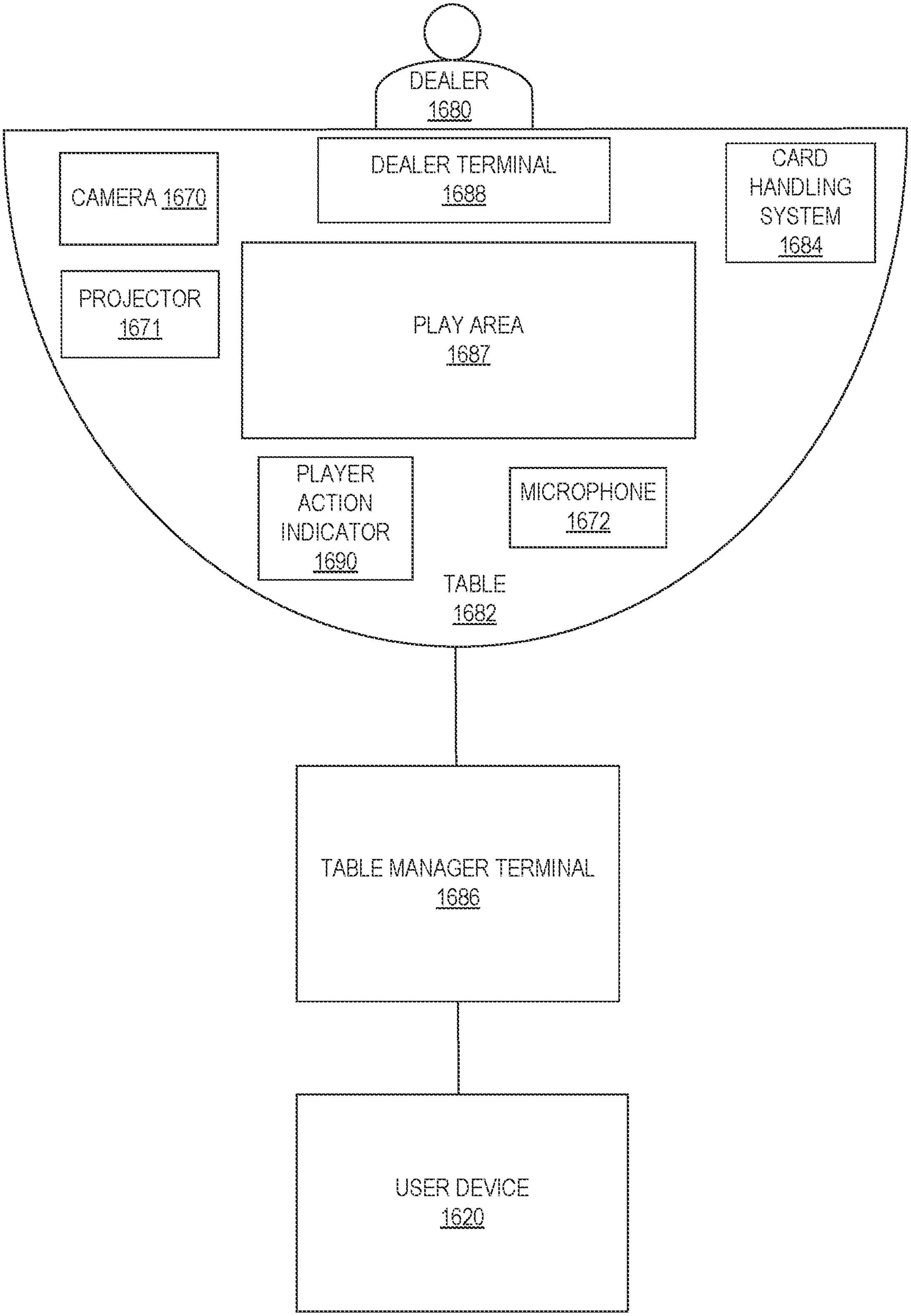
FIG. 6 is a schematic block diagram of a gaming system for implementing embodiments of wagering games including a live dealer feed.

In some embodiments, the one or more gaming servers 1610 may be configured as a single server to administer wagering games in combination with the user device 1620. In other embodiments, the one or more gaming servers 1610 may be configured as separate servers for performing separate, dedicated functions associated with administering wagering games. Accordingly, the following description also discusses "services" with the understanding that the various services may be performed by different servers or combinations of servers in different embodiments. As shown in FIG. 6, the one or more gaming servers 1610 may include a user interaction service 1612, a game service 1616, and an asset service 1614. In some embodiments, the one or more gaming servers 1610 may communicate with an account server 1632 performing an account service 1632. As explained more fully below, for some wagering type games, the account service 1632 may be separate and operated by a different entity than the gaming servers 1610; however, in some embodiments the account service 1632 may also be operated by the one or more gaming servers 1610.

The user device 1620 may communicate with the user interaction service 1612 through the network 1630. The user interaction service 1612 may communicate with the game service 1616 and provide game information to the user device 1620. In some embodiments, the game service 1616 may also include a game engine. The game engine may, for example, access, interpret, and apply game rules. In some embodiments, a single user device 1620 communicates with a game provided by the game service 1616, while other embodiments may include a plurality of user devices 1620 configured to communicate and provide end users with access to the same game provided by the game service 1616. In addition, a plurality of end users may be permitted to access a single user interaction service 1612, or a plurality of user interaction services 1612, to access the game service 1616. The user interaction service 1612 may enable a user to create and access a user account and interact with game service 1616. The user interaction service 1612 may enable users to initiate new games, join existing games, and interface with games being played by the user.

The user interaction service 1612 may also provide a client for execution on the user device 1620 for accessing the gaming servers 1610. The client provided by the gaming servers 1610 for execution on the user device 1620 may be any of a variety of implementations depending on the user device 1620 and method of communication with the gaming servers 1610. In one embodiment, the user device 1620 may connect to the one or more gaming servers 1610 using a web browser, and the client may execute within a browser window or frame of the web browser. In another embodiment, the client may be a stand-alone executable on the user device 1620.

For example, the client may comprise a relatively small amount of script (e.g., JAVASCRIPT®), also referred to as a "script driver," including scripting language that controls an interface of the client. The script driver may include simple function calls requesting information from the one or more gaming servers 1610. In other words, the script driver stored in the client may merely include calls to functions that are externally defined by, and executed by, the one or more gaming servers 1610. As a result, the client may be characterized as a "thin client." The client may simply send requests to the one or more gaming servers 1610 rather than performing logic itself. The client may receive player inputs, and the player inputs may be passed to the one or more gaming servers 1610 for processing and executing the wagering game. In some embodiments, this may involve providing specific graphical display information for the display 1622 as well as game outcomes.

As another example, the client may comprise an executable file rather than a script. The client may do more local processing than does a script driver, such as calculating where to show what game symbols upon receiving a game outcome from the game service 1616 through user interaction service 1612. In some embodiments, portions of the asset service 1614 may be loaded onto the client and may be used by the client in processing and updating graphical displays. Some form of data protection, such as end-to-end encryption, may be used when data is transported over the network 1630. The network 1630 may be any network, such as, for example, the Internet or a local area network.

In some embodiments the asset service 1614 may host various media assets (e.g., text, audio, video, and image files) to send to the user device 1620 for presenting the various wagering games to the end user. In other words, the assets presented to the end user may be stored separately from the user device 1620. For example, the user device 1620 requests the assets appropriate for the game played by the user; as another example, especially relating to thin clients, just those assets that are needed for a particular display event will be sent by the one or more gaming servers 1610, including as few as one asset. The user device 1620 may call a function defined at the user interaction service 1612 or asset service 1614, which may determine which assets are to be delivered to the user device 1620 as well as how the assets are to be presented by the user device 1620 to the end user. Different assets may correspond to the various user devices 1620 and their clients that may have access to the game service 1616 and to different variations of wagering games.

In some embodiments the game service 1616 may be programmed to administer wagering games and determine game play outcomes to provide to the user interaction service 1612 for transmission to the user device 1620. For example, the game service 1616 may include game rules for one or more wagering games, such that the game service 1616 controls some or all of the game flow for a selected wagering game as well as the determined game outcomes. The game service 1616 may include pay tables and other game logic. The game service 1616 may perform random number generation for determining random game elements of the wagering game. In one embodiment, the game service 1616 may be separated from the user interaction service 1612 by a firewall or other method of preventing unauthorized access to the game service 1612 by the general members of the network 1630.

The user device 1620 may present a gaming interface to the player and communicate the user interaction from the user input device 1624 to the one or more gaming servers 1610. The user device 1620 may be any electronic system capable of displaying gaming information, receiving user input, and communicating the user input to the one or more gaming servers 1610. For example, the user device 1620 may be a desktop computer, a laptop, a tablet computer, a set-top box, a mobile device (e.g., a smartphone), a kiosk, a terminal, or another computing device. As a specific, non-limiting example, the user device 1620 operating the client may be an interactive electronic gaming system. The client may be a specialized application or may be executed within a generalized application capable of interpreting instructions from an interactive gaming system, such as a web browser.

The client may interface with an end user through a web page or an application that runs on a device including, but not limited to, a smartphone, a tablet, or a general computer, or the client may be any other computer program configurable to access the one or more gaming servers 1610. The client may be illustrated within a casino webpage (or other interface) indicating that the client is embedded into a webpage, which is supported by a web browser executing on the user device 1620.

In some embodiments, components of the gaming system 1600 may be operated by different entities. For example, the user device 1620 may be operated by a third party, such as a casino or an individual, that links to the one or more gaming servers 1610, which may be operated, for example, by a wagering game service provider. Therefore, in some embodiments, the user device 1620 and client may be operated by a different administrator than the operator of the game service 1616. In other words, the user device 1620 may be part of a third-party system that does not administer or otherwise control the one or more gaming servers 1610 or game service 1616. In other embodiments, the user interaction service 1612 and asset service 1614 may be operated by a third-party system. For example, a gaming entity (e.g., a casino) may operate the user interaction service 1612, user device 1620, or combination thereof to provide its customers access to game content managed by a different entity that may control the game service 1616, amongst other functionality. In still other embodiments, all functions may be operated by the same administrator. For example, a gaming entity (e.g., a casino) may elect to perform each of these functions in-house, such as providing access to the user device 1620, delivering the actual game content, and administering the gaming system 1600.

The one or more gaming servers 1610 may communicate with one or more external account servers 1632 (also referred to herein as an account service 1632), optionally through another firewall. For example, the one or more gaming servers 1610 may not directly accept wagers or issue payouts. That is, the one or more gaming servers 1610 may facilitate online casino gaming but may not be part of a self-contained online casino itself. Another entity (e.g., a casino or any account holder or financial system of record) may operate and maintain its external account service 1632 to accept bets and make payout distributions. The one or more gaming servers 1610 may communicate with the account service 1632 to verify the existence of funds for wagering and to instruct the account service 1632 to execute debits and credits. As another example, the one or more gaming servers 1610 may directly accept bets and make payout distributions, such as in the case where an administrator of the one or more gaming servers 1610 operates as a casino.

Additional features may be supported by the one or more gaming servers 1610, such as hacking and cheating detection, data storage and archival, metrics generation, messages generation, output formatting for different end user devices, as well as other features and operations.

FIG. 6 is a schematic block diagram of a table 1682 for implementing wagering games including a live dealer video feed. Features of a gaming system 1600 (see FIG. 5) may be utilized in connection with this embodiment, except as further described. Rather than cards being determined by computerized random processes, physical cards (e.g., from a standard, 52-card deck of playing cards) may be dealt by a live dealer 1680 at a table 1682 from a card-handling system 1684 located in a studio or on a casino floor. A dealer terminal 1688 provides authorized access by the dealer 1680 to functionality of the gaming system 1600. In some embodiments, the dealer terminal 1688 includes and/or incorporates the tracking controller 204 (e.g., see FIG. 2). A table manager terminal 1686 may assist the dealer 1680 in facilitating play of the game by transmitting instructions to the dealer terminal 1688, by transmitting a live video feed of the dealer's actions to the user device 1620, by transmitting remote player elections to the dealer 1680, etc. As described above, the table manager terminal 1686 may act as or communicate with a gaming system 1600 (e.g., acting as the gaming system 1600 itself or as an intermediate client interposed between and operationally connected to the user device 1620 and the gaming system 1600 to provide gaming at the table 1682 to users of the gaming system 1600). Thus, the table manager terminal 1686 may communicate with the user device 1620 through network 1630 (see FIG. 5), and may be a part of a larger online casino, or may be operated as a separate system facilitating game play. In some embodiments, the table manager terminal 1686 includes and/or incorporates the tracking controller 204 (e.g., see FIG. 2) instead of, or in addition to, the dealer terminal 1688. In various embodiments, each table 1682 may be managed by an individual table manager terminal 1686 constituting a gaming device, which may receive and process information relating to that table. For simplicity of description, these functions are described as being performed by the table manager terminal 1686, though certain functions may be performed by an intermediary gaming system, such as the gaming system 1600 shown and described in connection with FIG. 5. In some embodiments, the gaming system 1600 may match remotely located players to tables 1682 and facilitate transfer of information between user devices 1620 and tables 1682, such as wagering amounts and player option elections, without managing gameplay at individual tables. In other embodiments, functions of the table manager terminal 1686 may be incorporated into gaming system 1600.

The table 1682 includes a camera 1670 and, optionally a microphone 1672, to capture video and audio feeds relating to the table 1682. The camera 1670 may be trained on the live dealer 1680, play area 1687, and card-handling system 1684. As the game is administered by the live dealer 1680, the video feed captured by the camera 1670 may be shown to the player remotely using the user device 1620, and any audio captured by the microphone 1672 may be played to the player remotely using the user device 1620. In some embodiments, the user device 1620 may also include a camera, microphone, or both, which may also capture feeds to be shared with the dealer 1680 and other players. In some embodiments, the camera 1670 may be trained to capture images of the card faces, chips, and chip stacks on the surface of the gaming table. Image extraction techniques (e.g., see FIG. 2 and/or FIG. 3 for details) may be used to obtain card count and card rank and suit information from the card images.

Card and wager data in some embodiments may be used by the table manager terminal 1686 to determine game outcome. The data extracted from the camera 1670 may be used to confirm the card data obtained from the card-handling system 1684, to determine a player position that received a card, and for general security monitoring purposes, such as detecting player or dealer card switching, for example. Examples of card data include, for example, suit and rank information of a card, suit and rank information of each card in a hand, rank information of a hand, and rank information of every hand in a round of play.

The live video feed permits the dealer to show cards dealt by the card-handling system 1684 and play the game as though the player were at a gaming table, playing with other players in a live casino. In addition, the dealer can prompt a user by announcing a player's election is to be performed. In embodiments where a microphone 1672 is included, the dealer 1680 can verbally announce action or request an election by a player. In some embodiments, the user device 1620 also includes a camera or microphone, which also captures feeds to be shared with the dealer 1680 and other players.

The card-handling system 1684 may be as shown and was described previously. The play area 1686 depicts player layouts for playing the game. As determined by the rules of the game, the player at the user device 1620 may be presented options for responding to an event in the game using a client as described with reference to FIG. 5.

The table 1682 also includes a projector 1671 to project gaming content, including images of outcome indicators at a surface of the table 1682 (e.g., see FIG. 3).

Player elections may be transmitted to the table manager terminal 1686, which may display player elections to the dealer 1680 using a dealer display associated with a dealer terminal 1688 and player action indicator 1690 on the table 1682. For example, the display of the dealer terminal 1688 may display information regarding where to deal the next card or which player position is responsible for the next action. In some embodiments, the dealer terminal 1688 has access to game rules. Furthermore, in some embodiments, the dealer terminal 1688 is jurisdictionally authorized to (e.g., possesses jurisdictionally authorized code to) store game outcome information that can be referred to in case of device malfunctions or disputes.

In some embodiments, the table manager 1686 may receive card information from the card-handling system 1684 to identify cards dealt by the card-handling system 1684. For example, the card-handling system 1684 may include a card reader to determine card information from the cards. The card information may include the rank and suit of each dealt card and hand information.

The table manager 1686 may apply game rules to the card information, along with the accepted player decisions, to determine gameplay events and wager results. Alternatively, the wager results may be determined by the dealer 1680 and input to the table manager terminal 1686, which may be used to confirm automatically determined results by the gaming system.

Card and wager data in some embodiments may be used by the table manager terminal 1686 to determine game outcome. The data extracted from the camera 1670 may be used to confirm the card data obtained from the card-handling system 1684, to determine a player position that received a card, and for general security monitoring purposes, such as detecting player or dealer card switching, for example.

The live video feed permits the dealer to show cards dealt by the card-handling system 1684 and play the game as though the player were at a live casino. In addition, the dealer can prompt a user by announcing a player's election is to be performed. In embodiments where a microphone 1672 is included, the dealer 1680 can verbally announce action or request an election by a player. In some embodiments, the user device 1620 also includes a camera or microphone, which also captures feeds to be shared with the dealer 1680 and other players.

Figure 7:
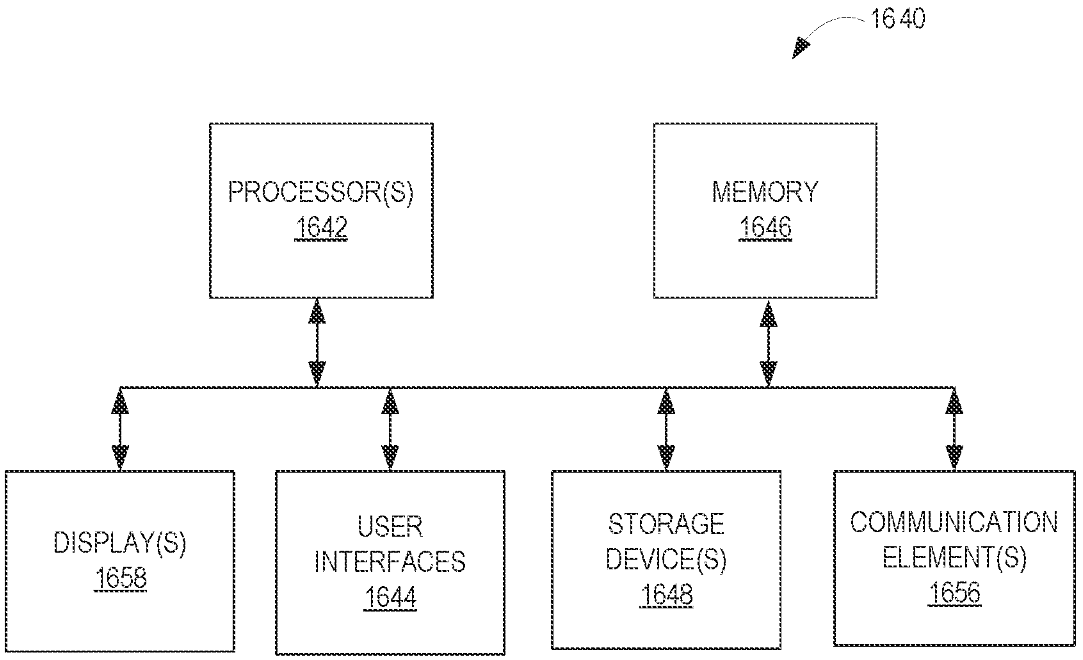
FIG. 7 is a block diagram of a computer for acting as a gaming system for implementing embodiments of wagering games in accordance with this disclosure.

FIG. 7 is a simplified block diagram showing elements of computing devices that may be used in systems and apparatuses of this disclosure. A computing system 1640 may be a user-type computer, a file server, a computer server, a notebook computer, a tablet, a handheld device, a mobile device, or other similar computer system for executing software. The computing system 1640 may be configured to execute software programs containing computing instructions and may include one or more processors 1642, memory 1646, one or more displays 1658, one or more user interface elements 1644, one or more communication elements 1656, and one or more storage devices 1648 (also referred to herein simply as storage 1648).

The processors 1642 may be configured to execute a wide variety of operating systems and applications including the computing instructions for administering wagering games of the present disclosure.

The processors 1642 may be configured as a general-purpose processor such as a microprocessor, but in the alternative, the general-purpose processor may be any processor, controller, microcontroller, or state machine suitable for carrying out processes of the present disclosure. The processor 1642 may also be implemented as a combination of computing devices, such as a combination of a DSP and a microprocessor, a plurality of microprocessors, one or more microprocessors in conjunction with a DSP core, or any other such configuration.

A general-purpose processor may be part of a general-purpose computer. However, when configured to execute instructions (e.g., software code) for carrying out embodiments of the present disclosure the general-purpose computer should be considered a special-purpose computer. Moreover, when configured according to embodiments of the present disclosure, such a special-purpose computer improves the function of a general-purpose computer because, absent the present disclosure, the general-purpose computer would not be able to carry out the processes of the present disclosure. The processes of the present disclosure, when carried out by the special-purpose computer, are processes that a human would not be able to perform in a reasonable amount of time due to the complexities of the data processing, decision making, communication, interactive nature, or combinations thereof for the present disclosure. The present disclosure also provides meaningful limitations in one or more particular technical environments that go beyond an abstract idea. For example, embodiments of the present disclosure provide improvements in the technical field related to the present disclosure.

The memory 1646 may be used to hold computing instructions, data, and other information for performing a wide variety of tasks including administering wagering games of the present disclosure. By way of example, and not limitation, the memory 1646 may include Synchronous Random Access Memory (SRAM), Dynamic RAM (DRAM), Read-Only Memory (ROM), Flash memory, and the like.

The display 1658 may be a wide variety of displays such as, for example, light-emitting diode displays, liquid crystal displays, cathode ray tubes, and the like. In addition, the display 1658 may be configured with a touch-screen feature for accepting user input as a user interface element 1644.

As nonlimiting examples, the user interface elements 1644 may include elements such as displays, keyboards, push-buttons, mice, joysticks, haptic devices, microphones, speakers, cameras, and touchscreens.

As nonlimiting examples, the communication elements 1656 may be configured for communicating with other devices or communication networks. As nonlimiting examples, the communication elements 1656 may include elements for communicating on wired and wireless communication media, such as for example, serial ports, parallel ports, Ethernet connections, universal serial bus (USB) connections, IEEE 1394 ("firewire") connections, THUNDERBOLT™ connections, BLUETOOTH® wireless networks, ZigBee wireless networks, 802.11 type wireless networks, cellular telephone/data networks, fiber optic networks and other suitable communication interfaces and protocols.

The storage 1648 may be used for storing relatively large amounts of nonvolatile information for use in the computing system 1640 and may be configured as one or more storage devices. By way of example and not limitation, these storage devices may include computer-readable media (CRM). This CRM may include, but is not limited to, magnetic and optical storage devices such as disk drives, magnetic tape, CDs (compact discs), DVDs (digital versatile discs or digital video discs), and semiconductor devices such as RAM, DRAM, ROM, EPROM, Flash memory, and other equivalent storage devices.

A person of ordinary skill in the art will recognize that the computing system 1640 may be configured in many different ways with different types of interconnecting buses between the various elements. Moreover, the various elements may be subdivided physically, functionally, or a combination thereof. As one nonlimiting example, the memory 1646 may be divided into cache memory, graphics memory, and main memory. Each of these memories may communicate directly or indirectly with the one or more processors 1642 on separate buses, partially combined buses, or a common bus.

As a specific, nonlimiting example, various methods and features of the present disclosure may be implemented in a mobile, remote, or mobile and remote environment over one or more of Internet, cellular communication (e.g., Broadband), near field communication networks and other communication networks referred to collectively herein as an iGaming environment. The iGaming environment may be accessed through social media environments such as FACEBOOK® and the like. DragonPlay Ltd, acquired by Bally Technologies Inc., provides an example of a platform to provide games to user devices, such as cellular telephones and other devices utilizing ANDROID®, iPHONE® and FACEBOOK® platforms. Where permitted by jurisdiction, the iGaming environment can include pay-to-play (P2P) gaming where a player, from their device, can make value based wagers and receive value based awards. Where P2P is not permitted the features can be expressed as entertainment only gaming where players wager virtual credits having no value or risk no wager whatsoever such as playing a promotion game or feature.

It is noted that the methods described herein can be played with any number of standard decks of 52 cards (e.g., 1 deck to 10 decks). A standard deck is a collection of cards comprising an Ace, two, three, four, five, six, seven, eight, nine, ten, jack, queen, king, for each of four suits (comprising spades, diamonds, clubs, hearts) totaling 52 cards. Cards can be shuffled or a continuous shuffling machine (CSM) can be used. A standard deck of 52 cards can be used, as well as other kinds of decks, such as Spanish decks, decks with wild cards, etc. The operations described herein can be performed in any sensible order. Furthermore, numerous different variants of house rules can be applied.

Note that in the embodiments played using computers (a processor/processing unit), "virtual deck(s)" of cards are used instead of physical decks. A virtual deck is an electronic data structure used to represent a physical deck of cards which uses electronic representations for each respective card in the deck. In some embodiments, a virtual card is presented (e.g., displayed on an electronic output device using computer graphics, projected onto a surface of a physical table using a video projector, etc.) and is presented to mimic a real life image of that card.

Methods described herein can also be played on a physical table using physical cards and physical chips (e.g., tokens) used to place wagers. Such physical chips can be directly redeemable for cash. When a player wins (dealer loses) the player's wager, the dealer will pay that player a respective payout amount. When a player loses (dealer wins) the player's wager, the dealer will take (collect) that wager from the player and typically place those chips in the dealer's chip rack. All rules, embodiments, features, etc. of a game being played can be communicated to the player (e.g., verbally or on a written rule card) before the game begins.

Initial cash deposits can be made into the electronic gaming machine which converts cash into electronic credits. Wagers can be placed in the form of electronic credits, which can be cashed out for real coins or a ticket (e.g., ticket-in-ticket-out) which can be redeemed at a casino cashier or kiosk for real cash and/or coins.

Any component of any embodiment described herein may include hardware, software, or any combination thereof.

Further, the operations described herein can be performed in any sensible order. Any operations not required for proper operation can be optional. Further, all methods described herein can also be stored as instructions on a computer readable storage medium, which instructions are operable by a computer processor. All variations and features described herein can be combined with any other features described herein without limitation. All features in all documents incorporated by reference herein can be combined with any feature(s) described herein, and also with all other features in all other documents incorporated by reference, without limitation.

Features of various embodiments of the inventive subject matter described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments which are defined only by the appended claims. Further, since numerous modifications and changes may readily occur to those skilled in the art, it is not desired to limit the inventive subject matter to the exact construction and operation illustrated and described, and accordingly all suitable modifications and equivalents may be resorted to, falling within the scope of the inventive subject matter.

What is claimed is:

1. A method of operating a gaming table, said method comprising:

determining, by at least one of a set of one or more processors in response to analysis of first image data by a computer vision model, an outcome value of a randomizing game object for a game played at the gaming table;

detecting, by at least one of the set of one or more processors based on the outcome value and one or more game rules, occurrence of a winning outcome for the game;

determining, by at least one of the set of one or more processors based on analysis of second image data by a machine-learning model, at least one location at a gaming-table surface related to the winning outcome;

rendering, by at least one of the set of one or more processors via the machine-learning model, a virtual-scene overlay having at least one outcome indicator positioned at pixel coordinates that correspond to the at least one location; and projecting, by at least one of the set of one or more processors via a projector at the gaming table, the virtual-scene overlay.

2. The method of claim 1, wherein the detecting the occurrence of the winning outcome for the game comprises determining that the outcome value is required for a specific outcome indicated by the one or more game rules.

3. The method of claim 1, wherein the randomizing game object comprises one or more of a die, a playing card, a playing tile, a roulette wheel, a numbered ball drawn from a container, or a spinning top.

4. The method of claim 1, wherein the randomizing game object comprises a playing card and the outcome value comprises a card value.

5. The method of claim 4, wherein the detecting the occurrence of the winning outcome for the game further comprises determining, in response to analysis of the second image data, that the card value combines with one or more additional card values of cards already dealt to the at least one location to form a winning card combination specified by the one or more game rules.

6. The method of claim 4 further comprising capturing the first image data via a camera of a card-handling device at the gaming table and capturing the second image data via a table camera at the gaming table, wherein the table camera is different from the camera of the card-handling device.

7. The method of claim 6, wherein the machine-learning model is trained according to training images of one or more objects on the gaming-table surface relative to the at least one location, wherein the training images are taken via a first perspective of the table camera, and wherein the virtual-scene overlay is generated via a virtual-scene camera having a second perspective modeled according to the first perspective.

8. The method of claim 7, wherein at least some of the training images display at least one playing card having dimensions equivalent to that of the playing card, wherein the determining the at least one location comprises detecting, via feature extraction of the machine-learning model, one or more point locations of physical features of the playing card within a frame of the second image data.

9. The method of claim 8, wherein the rendering the virtual-scene overlay comprises:

transforming, by at least one of the set of one or more processors via the machine-learning model, the one or more point locations into isomorphically equivalent points on the virtual-scene overlay that correspond to the pixel coordinates;

generating, by at least one of the set of one or more processors, a segmentation mask for the one or more objects, wherein the segmentation mask is positioned at the pixel coordinates; and positioning, by at least one of the set of one or more processors, the at least one outcome indicator relative to the segmentation mask.

10. The method of claim 9, wherein the transforming comprises one or more of geometrically rotating, translating, or scaling the one or more point locations using one or more of a homography transformation, an affine transformation, a projective transformation matrix, a linear transformation, or a barycentric transformation.

11. The method of claim 9, wherein the projecting comprises modifying a visual property of the at least one outcome indicator to conform to a shape of the segmentation mask.

12. The method of claim 7, wherein the projector has a projection perspective substantially aligned to the first perspective of the table camera.

13. The method of claim 4, wherein the projecting comprises projecting, at the at least one location, one or more images of indicia of the card value.

14. The method of claim 4, wherein the projecting comprises:

detecting, by at least one of the set of one or more processors in response to analysis of the second image data, a moment when the playing card is placed face up on the gaming-table surface to reveal the card value; and projecting the virtual-scene overlay in response to detecting the moment that the card is placed face up.

15. The method of claim 4, wherein the projecting comprises:

estimating, by at least one of the set of one or more processors, a time period to pause before projecting the virtual-scene overlay, wherein the time period is measured from a first moment that the winning outcome is detected to a second moment that the virtual-scene overlay is projected via the projector, wherein the estimating the time period is based on one or more of card-distribution rules, a dealing speed, or a distance from a card-distribution device to the at least one location; and projecting, after the time period, the virtual-scene overlay.

16. A system comprising:

one or more sensors, wherein at least one of the one or more sensors is configured to capture first image data of a randomizing game object for a game played at a gaming table, and wherein at least one of the one or more sensors is configured to capture second image data of a gaming area associated with the gaming table; and one or more processors configured to execute instructions, which when executed perform operations that cause the system to:

determine, in response to analysis of the first image data, an outcome value of the randomizing game object;

detect, based on the outcome value and one or more game rules, occurrence of a winning outcome for the game;

determine, based on analysis of the second image data by a machine-learning model, at least one location at a gaming-table surface related to the winning outcome;

render a virtual-scene overlay having at least one outcome indicator positioned at pixel coordinates that correspond to the at least one location; and project, via a projector, the virtual-scene overlay at the gaming table.

17. The system of claim 16, wherein the randomizing game object comprises a playing card and the outcome value comprises a card value, and wherein the machine-learning model is trained according to training images of one or more objects on the gaming-table surface relative to the at least one location, wherein the training images are taken via a first perspective of the at least one of the one or more sensors configured to capture the second image data, and wherein the virtual-scene overlay is generated via a virtual-scene camera having a second perspective modeled according to the first perspective.

18. The system of claim 17, wherein at least some of the training images display an additional playing card having dimensions equivalent to that of the playing card, wherein the one or more processors are configured to execute instructions, which when executed perform operations that cause the system to detect, via feature extraction of the machine-learning model, one or more point locations of physical features of the playing card within a frame of the second image data.

19. The system of claim 18 wherein the one or more processors are configured to execute instructions, which when executed perform operations that cause the system to:

transform, via the machine-learning model, the one or more point locations into isomorphically equivalent points on the virtual-scene overlay that correspond to the pixel coordinates;

generate a segmentation mask for the one or more objects, wherein the segmentation mask is positioned at the pixel coordinates; and position the at least one outcome indicator relative to the segmentation mask.

* * * * *